United States Patent
Muthiah et al.

(10) Patent No.: US 12,236,112 B2
(45) Date of Patent: Feb. 25, 2025

(54) SECURING A DATA STORAGE DEVICE AGAINST ROGUE HOSTS

(71) Applicant: Western Digital Technologies, Inc., San Jose, CA (US)

(72) Inventors: Ramanathan Muthiah, Bangalore (IN); Adarsh Sreedhar, Bangalore (IN); Niraj Srimal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 403 days.

(21) Appl. No.: 17/728,850

(22) Filed: Apr. 25, 2022

(65) Prior Publication Data

US 2023/0342042 A1 Oct. 26, 2023

(51) Int. Cl.
*G06F 3/06* (2006.01)
*G06F 21/55* (2013.01)
*G06F 21/79* (2013.01)
*H04L 9/40* (2022.01)

(52) U.S. Cl.
CPC .......... *G06F 3/0622* (2013.01); *G06F 3/0635* (2013.01); *G06F 3/064* (2013.01); *G06F 3/0679* (2013.01); *G06F 21/554* (2013.01); *G06F 21/79* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,934,848 B1 * | 8/2005 | King | G06Q 20/367 707/999.009 |
| 9,544,798 B1 * | 1/2017 | Ahmadzadeh | H04L 63/1408 |
| 10,146,936 B1 | 12/2018 | Khanduja | |
| 2011/0202534 A1 * | 8/2011 | Allerton | G06Q 10/00 707/738 |
| 2012/0017281 A1 * | 1/2012 | Banerjee | G06F 21/577 726/25 |

(Continued)

OTHER PUBLICATIONS

Singh, Malvika, Babu M. Mehtre, and S. Sangeetha. "User behavior profiling using ensemble approach for insider threat detection." 2019 IEEE 5th International Conference on Identity, Security, and Behavior Analysis (ISBA). IEEE, 2019 (Year: 2019).*

(Continued)

*Primary Examiner* — Paul R Fisher
(74) *Attorney, Agent, or Firm* — Patent Law Works LLP

(57) ABSTRACT

A method for securing a data storage device (DSD) against rogue behaviour by a host, the method executed by a controller of the DSD and comprising: determining a host type of the host; detecting one or more access activities performed by the host on the DSD; processing the one or more access activities to determine a security threat level of the host, wherein the security threat level is determined by weighting one or more corresponding access activity parameters by one or more impact weights; and in response to determining that the security threat level of the host is greater than or equal to a rogue host threat level, controlling the access activities performable by the host on the DSD to safeguard the DSD against the host, wherein the one or more impact weights are dynamically determined based on the host type.

20 Claims, 11 Drawing Sheets

(56) References Cited

U.S. PATENT DOCUMENTS

| | | | |
|---|---|---|---|
| 2013/0332221 A1* | 12/2013 | Fay | G06Q 10/06313 |
| | | | 705/7.23 |
| 2014/0059271 A1* | 2/2014 | Meir | G06F 3/0656 |
| | | | 711/159 |
| 2016/0173330 A1* | 6/2016 | Yun | H04B 1/3822 |
| | | | 370/255 |
| 2018/0006912 A1* | 1/2018 | Sokolik | G06F 16/22 |
| 2019/0332794 A1 | 10/2019 | Kabra et al. | |
| 2020/0311280 A1* | 10/2020 | Byrne | G06F 3/0647 |

OTHER PUBLICATIONS

Pennington et al, 'Storage-Based Intrusion Detection', ACM Transactions on Information and System Security, vol. 13, No. 4, Article 30, Pub. date: Dec. 2010.

Halme et al, 'AINT Misbehaving: A Taxonomy of Anti-Intrusion Techniques', Retrieved online, URL: < http://www.secdev.org/idsbiblio/halme95aint.html>, accessed on Dec. 24, 2021.

Griffin et al.,'On the feasibility of intrusion detection inside workstation disks', Carnegie Mellon University Parallel Data Lab Technical Report CMU-PDL-03-106, Dec. 2003.

\* cited by examiner

SECURING A DATA STORAGE DEVICE AGAINST ROGUE HOSTS

TECHNICAL FIELD

This disclosure relates to securing a data storage device against rogue behaviour of a host in a multi-host environment.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the drive as a block data storage device such that a user of the device may access the storage of the drive via the data path (e.g., through operation of the host computer). Access to the drive typically enables a user to access (e.g., read, write and/or modify) user data stored on the drive.

Some DSDs are configured for use in multi-host applications, where the data storage device connects to, and provides data access related services to, a plurality of host computing systems. For example, an external drive may be fitted with multiple data ports which collectively provide a corresponding number of host computing systems with the ability to access the block data storage of the DSD via one or more corresponding data paths (e.g., by issuing data read/write requests to the device). Alternatively, or in addition, the DSD may establish a wireless communication channel with each of a plurality of host computing systems for the purpose of exchanging data between the respective devices.

It is desirable to secure the user data of a data storage device against access by unauthorized parties (i.e., via the respective connected host). However, for data storage devices operating in multi-host applications, there is also a need to ensure integrity of service and the accessibility of the data storage device to each of the authorized hosts.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Disclosed herein is a method for securing a data storage device (DSD) against rogue behaviour by a host, the method executed by a controller of the DSD and comprising:

- determining a host type of the host;
- detecting one or more access activities performed by the host on the DSD;
- processing the one or more access activities to determine a security threat level of the host, wherein the security threat level is determined by weighting one or more corresponding access activity parameters by one or more impact weights; and
- in response to determining that the security threat level of the host is greater than or equal to a rogue host threat level, controlling the access activities performable by the host on the DSD to safeguard the DSD against the host,
- wherein the one or more impact weights are dynamically determined based on the host type.

In some embodiments, at least one of the access activity parameters are determined by calculating an indication of a deviation between the corresponding detected access activity of the host and an associated expected access activity of the determined host type.

In some embodiments, the rogue host threat level is a numerical threshold value determined, at least in part, based on the host type.

In some embodiments, the access activities comprise any one or more of:

- requesting to read data from, or write data to, a storage medium of the DSD;
- requesting access to one or more logical region blocks of the storage medium of the DSD; and
- receiving data from, or transmitting data to, a data path of the DSD.

In some embodiments, determining the access activity parameter for the detected access activity includes:

- determining observation values of one or more corresponding activity criteria, the activity criteria providing an assessment of the detected access activity as performed by the host on the DSD;
- retrieving expected values of the one or more corresponding activity criteria, wherein the expected values are determined based on the host-type; and
- calculating the access activity parameter as an indication of a deviation between the observed criteria values and the expected criteria values.

In some embodiments, the values of the activity criteria include respective indications of:
- a type of the access activity;
- a number of occurrences of the access activity;
- one or more data features representing one or more characteristics of the access activity; and one or more permission features representing a permission of the host to perform the access activity on the DSD.

In some embodiments, the one or more data features are determined by a data parsing operation conducted prior to storage of any of the corresponding access activity data in the DSD.

In some embodiments, the host type is determined by a pre-specified mapping that associates at least one identifier of the host to the host type.

In some embodiments, the pre-specified mapping is determined according to:
- a host-assisted determination process, wherein the host informs the DSD to associate the host with one of a plurality of host types; or
- a device-detected determination process, wherein the DSD determines a prior data access pattern of the host and determines the host type from an association between the prior data access pattern and a known data access pattern.

In some embodiments, the host type is determined based on the detection of the one or more access activities of the host, such as to dynamically determine the host type irrespective of any pre-specified mapping.

In some embodiments, at least one of the access activity parameters are determined by calculating an indication of a match between the corresponding detected access activity performed by the host and one or more irregular activities.

In some embodiments, the one or more irregular activities comprise any one or more of:
- one or more irregular commands submitted by the host, wherein the identification of a command as irregular is based on one or more expected commands of the host;
- data thrashing of pre-fetched data exceeding a system data thrashing threshold; and
- one or more irregular activity patterns of the host, wherein the identification of an activity pattern as irregular is based on a deviation between one or more observed activity patterns of the host, and one or more learned activity patterns of the host.

In some embodiments, controlling the access activities of the host to safeguard the DSD comprises one or more of:
- initiating an intimation to the host;
- conducting one or more rule-based data flushes;
- re-authenticating the host;
- re-evaluating the host type of the host if the host is re-authenticated;
- reducing one or more levels of accessibility permissions; and
- blacklisting the host.

In some embodiments, conducting one or more rule-based data flushes further comprises buffering data received from the host, and in response to determining the security threat level of the host is less than the rogue host threat level, enabling the buffered data to be stored in the DSD.

In some embodiments, re-authenticating the host further comprises one or more of:
- verifying one or more authentication signatures of the host;
- verifying the identity of the host; and determining whether the host is blocked by one or more servers.

Disclosed herein is a data storage device (DSD) comprising:
- a non-volatile storage medium configured to store user data;
- a data path configured to transmit at least data between the storage medium of the data storage device and a host computer system; and
- a controller configured to:
  - determine a host type of the host;
  - detect one or more access activities performed by the host on the DSD;
  - process the one or more access activities to determine a security threat level of the host, wherein the security threat level is determined by weighting one or more corresponding access activity parameters by one or more impact weights, and wherein the one or more impact weights are dynamically determined based on the host type; and
  - control, in response to determining that the security threat level of the host is greater than or equal to a rogue host threat level, the access activities of the host to safeguard the DSD against the host.

In some embodiments, at least one of the access activity parameters are determined by calculating an indication of a deviation between the corresponding monitored access activity of the host and an associated expected access activity of the determined host type, and
wherein the rogue host threat level is a numerical threshold value determined, at least in part, based on the host type.

In some embodiments, at least one of the access activity parameters are determined by calculating an indication of a match between the corresponding detected access activity performed by the host and one or more irregular activities.

In some embodiments, the access activities comprise any one or more of:
- requesting to read data from, or write data to, a storage medium of the DSD;
- requesting access to one or more logical region blocks of the storage medium of the DSD; and
- receiving data from, or transmitting data to, a data path of the DSD.

Disclosed herein is a data storage device (DSD) comprising:
- means for storing user data;
- means for transmitting at least data between a host and the data storage device;
- means for determining a host type of the host;
- means for detecting one or more access activities performed by the host on the DSD;
- means for processing the one or more access activities to determine a security threat level of the host, wherein the security threat level is determined by weighting one or more corresponding access activity parameters by one or more impact weights, and wherein the one or more impact weights are dynamically determined based on the host type; and
- means for controlling, in response to determining that the security threat level of the host is greater than or equal to a rogue host threat level, the access activities of the host to safeguard the DSD against the host.

BRIEF DESCRIPTION OF DRAWINGS

Some embodiments are described herein below with reference to the accompanying drawings, wherein.

DESCRIPTION OF EMBODIMENTS

Data storage devices (DSDs) may be subject to malicious activity, or attacks, from a connected host computing system (referred to as a "rogue host" performing "rogue behaviors"). For example, these malicious activities may include: issuing a surge of overwrite data requests (which may be spread over the memory space); flushing data in a particular range of block addresses (i.e., where requests are localized in memory space); issuing delete requests to erase a large chunk of data in the memory space; and flooding the device with commands to prevent the device from responding to other legitimate commands in a timely manner (i.e., analogous to a denial-of-service attack).

Malicious activity by a connected host often has several unwanted consequences. First, the malicious activity may result in a breach in the security of the data stored in the DSD (e.g., within a storage medium). That is, an unauthorized party may be able to compromise the access control measures of the DSD in order to gain unrestricted access to stored data which the party is otherwise not permitted to access. Second, even if the user data stored in the DSD is not breached, malicious activity by a single rogue host often still has a detrimental effect on the normal operation of the device.

For example, data request flooding may significantly reduce the ability of the DSD to respond to access activities (e.g., data read and/or write requests) made by other connected hosts in a multi-host operational environment of the DSD. In some cases, this may result in the inability of a non-rogue host to access data, or otherwise utilize the DSD in a manner for which the host is authorized to do so. It is therefore desired to provide a data storage device that ameliorates one or more of these difficulties, or other difficulties of the prior art, or that at least provides a useful alternative.

Overview

Figure 1A:
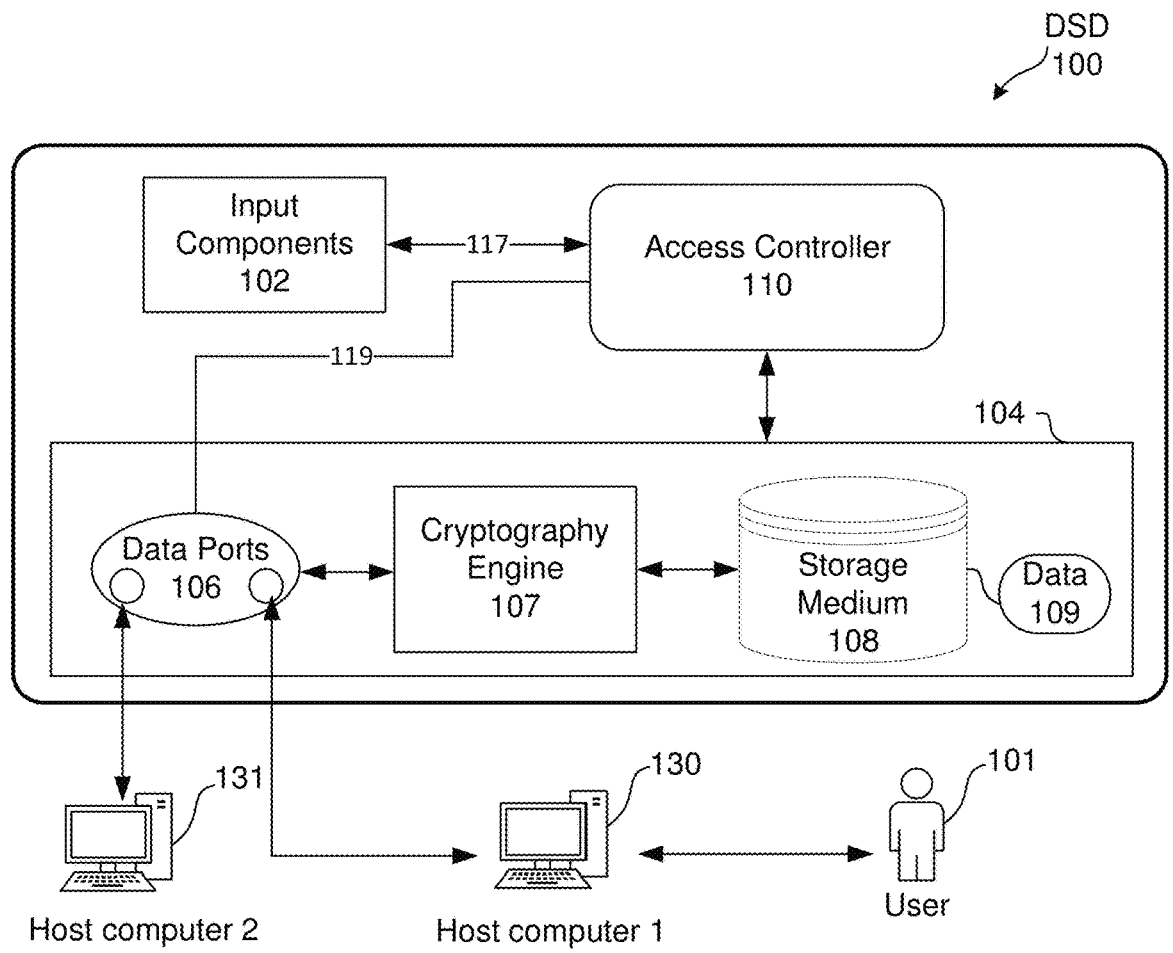
FIG. 1*a* illustrates an example data storage device (DSD) according to one embodiment.

With reference to FIG. 1*a*, there is disclosed an exemplary data storage device (DSD) 100 including an access controller 110 configured to enhance the security of the DSD 100 against rogue behaviour of a host 131 by (i) detecting access activities performed by a host 131 on the DSD 100 and determining, based on the detected access activities and a set of expected access activities for the host 131, or otherwise known irregular activities, that the host 131 is a security threat to the DSD 100; and (ii) in response, taking corresponding actions to control the activities that may be performed by the host 131 on the DSD 100. The term "access activity" generally refers to any operation or associated behaviour in which host 131 utilizes the functional capabilities of the DSD 100, involving, for example, the exchange of control commands and/or data between host 131 and the DSD 100.

Specifically, in the described embodiments a security threat level of the host 131 is determined based on the extent to which the detected access activities of the host 131 deviate from the expected access activities, as represented by respective activity parameter values. The activity parameter values are weighted by corresponding impact weights, such that the accumulation of the weighted parameter values represents a relative indication of the threat posed by the host 131 on the security of the DSD 100. The impact weights are determined based on a dynamic assessment of the behaviour of the host for the respective detected access activities, such as for example by a mapping between a set of particular impact weight values and a host-type of the host. By comparing the determined security threat level of the host 131 to a security threshold (referred to as the "rogue host threat level"), the DSD 100 is able to detect that the host 131 is performing activities that are suspicious or malicious (i.e., "rogue behaviour") and subsequently control the access activities of that host.

The data storage devices and device security methods disclosed herein are advantageous in that the DSD 100 is able to identify malicious behaviour of a connected host, such as host 131, dynamically based on knowledge of the expected behaviour of the host (or other pre-specified malicious behaviors known to the device 100), and the impact on which deviations from this expected behaviour, or conformity to pre-specified threat ("irregular") behaviour, may compromise the security of the DSD 100. Significantly, the knowledge of the expected behaviour of the host 131 is determined based on its host-type, which enables the DSD 100 to make decisions about whether a particular host is acting maliciously in accordance with its functional purpose.

The DSD 100 may operate in a multi-host environment, as depicted for example in FIG. 1*a* where the first and second hosts 130 and 131 are simultaneously connected to the DSD 100 via a plurality of respective data ports 106. In such embodiments, the methods described herein secure the DSD 100 against access activities performed by host 131, in response to the host 131 behaving as a rogue host, thereby enabling the DSD 100 to provide services to the host 130 that is exhibiting normal behaviour.

In some embodiments the access controller 110 of the DSD 100 detects (or "observes"), monitors, and/or records the behaviour of a connected host 131, 130. For example, this may include detecting one or more access activities performed by the host 131 on the DSD 100. The access controller 110 then compares measurements of the detected (or monitored) behavior with corresponding measurements or pre-known indications of expected host behavior, and analyzes the deviation between the same in order to determine whether the connected host is a security threat.

The DSD 100 determines and/or dynamically adjusts the expected behaviour of a host 131 based on the access activities observed for the host 131, or for other hosts of the same host-type. In some embodiments, the access controller 110 is configured to update the indications of the expected behavior for a particular host-type based on the detected access activities (i.e., based on the observed values of measurements of the access activities, referred to as the "activity criteria", as described herein below).

In some embodiments, the access controller 110 updates the indications of the expected behavior via a machine learning algorithm. For example, in embodiments where the access activity parameters are calculated according to a pattern classification technique, the access controller 110 may be configured to update one or more background models, or access activity specific models, based on the observed values of the detected access activities.

Furthermore, localizing the identification and subsequent mitigation of malicious host activities to the DSD 100, and specifically the access controller 110, provides further advantages, including: an ability to leverage direct access to the physical data path between the host 131 and the DSD 100 in order to efficiently process access activity data (i.e., to determine the access activity parameter values); and the ability to apply host-specific access activity rules without the requirement of installing software on the host 131. This reduces or eliminates the ability of an attacker to disable, hinder, or otherwise maliciously target the access controller 110 by making corresponding attacks against the operating system of the host 131. This enables the DSD 100 to safeguard itself against rogue behavior of a host 131, thereby maintaining: (i) the integrity of the data 109 stored within a storage medium 108 of the DSD 100, and (ii) the ability of other hosts 130 to access the stored data 109.

In the described embodiments, the access activity parameters $p_i$ are numerical values that are determined by calculating an indication of a deviation between the corresponding detected access activity performed by the host 131 on the DSD 100 and an associated expected access activity of the determined host-type. That is, each parameter value measures the extent to which a host deviates from the expected behaviour with respect to particular functions related to accessing the DSD, as represented by the access activity.

In the examples presented herein, the set of access activities A represents a group of operations, functions, or commands performed by host 131 on the DSD 100, and may include, but is not limited to: a data access request ($A_{request}$), including requesting to read data from, or write data to, a storage medium 108 of the DSD 100; a logical region access ($A_{LRB}$) including requesting access to one or more logical region blocks of the storage medium 108 of the DSD 100; and a data transfer ($A_{transfer}$), including receiving data from, or transmitting data to, a data path 104 of the DSD 100.

For example, in some embodiments a data access request activity $A_{request}$ includes the host 131 sending a request to read particular data from storage 108 of DSD 100. For example, a data access request activity $A_{request}$ can be a random/direct access request or a sequential access request to the data stored in the storage 108.

A logical region access activity $A_{LRB}$ may occur when the host 131 issues a read (or write) command to the DSD 100, where the command specifies a particular block region of memory (i.e., irrespective of whether the command also specifies other information as part of the read/write request). For example, a logical region access activity $A_{LRB}$ can include a logical block address (LBA), where the host 131 is provided with a simple linear address space and can provide an LBA address to the DSD 100 without knowledge of the physical section positions on the DSD 100.

A data transfer access activity $A_{transfer}$ may occur whenever the host or the DSD 100 sends data through the data path 104 to be received by the respective other device. A data transfer access activity $A_{transfer}$ can occur following a data access request activity $A_{request}$, or a logical region access activity $A_{LRB}$. However, in some embodiments, the DSD 100 is configured to detect and analyze data transfer access activities $A_{transfer}$ that occur without a corresponding access request (i.e., a spontaneous or ad-hoc data transfer).

To calculate a corresponding activity parameter $p_i$ for a particular access activity, the access controller 110 defines one or more access activity criteria $c=c_1, \ldots c_M$. The access activity criteria $c_1, \ldots, c_M$ are used to assess the (observed and expected) behaviour of the host specific to the performed access activity $A_L$, where access activity parameter $p_i$ represents an indication of the deviation of the observed behaviour of the host from the expected behaviour in association with the access activity $A_1$.

In the described embodiments, determining each access activity parameter $p_i$ includes determining observation values $o=o_1, \ldots o_M$ of one or more corresponding activity criteria $c=c_1, \ldots c_M$, the activity criteria providing an assessment of the access activity as performed by the host on the DSD 100; retrieving expected values $e=e_1, \ldots e_M$ of the one or more corresponding activity criteria, wherein the expected values are determined based on the host-type; and calculating the access activity parameter $p_i$ as an indication of a deviation between the observed criteria values $o=o_1, \ldots o_M$ and the expected criteria values $e=e_1, \ldots e_M$.

In the described embodiments, the access controller 110 of the DSD 100 determines particular activity criteria by which to assess the access activity performed by the host. Activity criteria may be pre-specified for one or more access activities in a stored data structure of the controller 110. For example, for an access activity requesting to read data from, or write data to, a storage medium 108 of the DSD 100 ($A_{request}$), the corresponding criteria c used to determine the activity parameter may be: ($c_1$) the presence of a read type data access request and ($c_2$) the number of read requests issued by the host in a pre-specified time period, such as 60 seconds.

In the described embodiments, the activity criteria for assessing an access activity A may include respective indications of: a type of the access activity; a number of occurrences of the access activity; one or more data features representing one or more pre-specified characteristics of the access activity; and one or more permission features representing pre-specified permissions of the host to perform the access activity on the DSD. The number of occurrences of the access activity can be determined over a particular time interval, such as, for example, a sliding window of a pre-specified duration. In some embodiments, the type of the access activity is determined from a set of known types associated with the detected access activity. For example, in response to determining that host 131 is performing a data transfer activity ($A_{transfer}$), the activity criteria $c_1$ may be whether the host is receiving data from the DSD, where the values $o_1$ and $e_1$ are binary values (i.e., '1' indicating a transfer of data from DSD to host, and '0' indicating that the data transfer is from host to DSD).

In the described embodiments, the access controller 110 is configured to perform a data parsing operation to determine the one or more data features to assess a data transfer activity ($A_{transfer}$) (i.e., as activity criteria). The data transferred through the data path 104 as part of the data transfer activity ($A_{transfer}$) is referred to as the activity data. The data parsing operation may involve controller 110 performing an analysis of segments of the transferred activity data, and subsequently generating one or more data features in response to determining that one or more of the parsed segments have specific characteristics. In the described embodiments, the controller 110 may perform byte-wise data parsing to identify the presence of particular data bytes (e.g., an MPEG sync byte) enabling the controller 110 to set a data feature value indicating that the activity data has a particular characteristic (e.g., that the data includes video media).

The controller 110 may be configured to perform the data parsing operation repeatedly, and/or according to an periodic, intermittent, or otherwise pre-specified schedule. For example, the access controller 110 may be configured to perform activity data parsing periodically (e.g., once per minute), or dynamically in response to the occurrence of a particular triggering event (e.g., where the data transfer exceeds a threshold for the amount of data transferred, or a duration of the transfer). The periodicity or schedule of the data parsing operation may vary depending on the host-type.

In some embodiments, the access controller 110 is configured to perform parsing of the activity data 'on-the-fly' (i.e., prior to the storage of the access activity data in the DSD 100). The ability to perform data parsing on-the-fly, and/or periodically, may be advantageous in reducing the amount of computation required by the controller 110, particularly for a DSD 100 with a large number of connected hosts, and/or where the connected hosts are configured to frequently send or receive large amounts of data from the device storage medium 108.

In the described embodiments, the access controller 110 is configured to perform a permissions check operation in response to the detection of an access activity performed by the host on the DSD 100. The permissions check operation enables the access controller 110 to check the permission of the host to carry-out the access activity, and to generate one or more permission features representing the same. For example, the access controller 110 may be configured to maintain, in a table, array, list, or similar data structure, an indication of whether a host of a particular host-type has permission to perform one or more of the access activities A detectable by the DSD 100. The generation of permission features enables the access controller 110 to determine whether the access activities of the host are within, or outside of, the defined access control boundaries for the host, and to utilize this as a criterion to assess the host behaviour.

Performing activity data parsing and/or permission checking is generally advantageous in enabling the DSD 100 to assess the access activity performed by a host 131 dynamically and in real-time. For example, the data parsing operation enables the controller 110 to physically examine the activity data passed through the data path 104. This enables the controller 110 to generate data features describing characteristics of the activity data, and then, by comparing these observed characteristic values to expected values, determine whether the activity data transfer is reasonable in accordance with the normal behavior for the host (e.g., based on the host-type, and/or historical activities of the host).

The DSD 100 may be configured to calculate the activity parameter $p_i$ for an access activity $A_i$ based on a data activity pattern of the host. In the described embodiments, a data activity pattern is defined, for one or more access activities, as a pre-specified combination of the values of any one or more of the relevant activity criteria $c=c_1, \ldots c_M$. For example, the access controller 110 may determine a read/write activity pattern to assess the number of read and write requests issued by the host (i.e., in association with detected data access request activities $A_{request}$). The read/write activity pattern may include the values of the "type of access activity" and "number of occurrences of the access activity within a time interval" criteria, measured as activity criteria observation vectors o. The access controller 110 may be configured to enable the creation of one or more data activity patterns for the assessment of any pre-specified access activity, via the selection of an arbitrary number of the pre-specified activity criteria.

In some embodiments, the expected and observed values of the activity criteria used by the DSD 100 to assess the access activities $A_i$ are represented as an expected activity criteria matrix $E_i$ (indicating the expected behaviour of the host) and an observed activity criteria matrix $O_i$ (indicating the observed or monitored behaviour of the host). In some embodiments, the expected activity criteria matrix $E_i$ is host independent and contains values representing an indication of the generalized behaviour expected of any host connected to the DSD 100, with respect to the access activity.

In other embodiments, the DSD 100 is configured to store and retrieve expected activity data that is specific to a connected host based on its determined host-type. For example, the expected activity criteria matrix E of a surveillance host may include different values for a read/write activity pattern as compared to a gaming host (i.e., since the DSD 100 expects that the surveillance host will perform a larger number of write requests vs read requests, as compared to the gaming host, when both hosts are acting non-maliciously).

In some of the described embodiments, the parameter value ($p_i$) indicates the extent of the deviation between particular expected criteria value(s), as retrieved from expected activity criteria matrix $E_i$, and the detected criteria value(s) of criteria matrix $O_i$ for the particular access activity. For example, in embodiments where the expected and observed criteria values are stored as matrixes, the deviation may be represented by applying a closed-form mathematical function to the observed and expected criteria values. For example, the access controller 110 may be configured to apply a norm function to the difference of $O_i$ and $E_i$. An alternative closed-form expression for the deviation may involve performing a Hadamard division of $O_i$ and $E_i$, and comparing the result with a matrix of ones. In other embodiments, the access controller 110 is configured to determine the activity parameter value(s) by the application of machine learning and/or pattern classification methods.

In some embodiments, the access activity parameter values $p_i$ are scaled by corresponding impact weights $w_i$ determined dynamically, at least in part, based on a host-type. The host-type represents a categorization of the host devices 131, 130 based on their characteristics. For example, the host 131 may be any possible host-type in the multi-host environment, such as gaming hosts, surveillance hosts, fully-sequential-writing-only hosts, writing-unrestricted hosts, deleting-unrestricted hosts and access-unrestricted hosts.

The use of dynamically-adjustable impact weights $w_i$ enables the DSD 100 to dynamically adjust the effect that each access activity parameter has on the overall determination of the security threat level of host, based on the host characteristics (i.e., on the expected or actual prior behaviour of the host 131). This is advantageous in increasing the accuracy of the determined security threat level for the host, since this threat level assessment: a) becomes more tailored to a specific type of host; and b) and can be adjusted over time. Furthermore, the use of a security threat level $L_h$ that is determined dynamically according to the host characteristics assists with minimizing the incidents of false positives in detecting rogue behaviour. In some embodiments, in response to comparing the determined security threat level $L_h$ of a host 131 to the rogue host threat level, the DSD 100 is configured to adjust the relative data access activity priorities of one or more connected hosts 130, 131. For example, in response to determining that the host 131 is a rogue host (i.e., the security threat level $L_h$ exceeds the rogue host threat level), the DSD 100 may reduce the relative priority of host 131 compared to host 130, in the case that host 130 is determined to be behaving normally.

In some embodiments, the host-type is determined by the DSD 100 prior to deriving the access activity parameters $p_i$. The host-type determination can either be based on a pre-specified mapping stored in the DSD 100, or based on monitoring device activities irrespective of any pre-specified mapping. The determination based on the pre-specified mapping may further include a host-assisted determination process and a device-detected determination process. The utilization of a pre-specified mapping to determine the host-type enables the DSD 100 to profile the host for the purpose of determining its expected functionality, while maintaining a level of generality in the functional characterization that advantageously reduces the risk of false alarms that may require unnecessary re-authentications and thereby affect Quality-of-service (QoS) for the host. The determination of the host-type based on detecting or monitoring the access activities of the host as performed on the DSD 100, is also advantageous in that is enables the DSD 100 to adapt initial characterizations of host-types to improve their accuracy, and/or to, in some embodiments, learn to recognize new host-types that are not defined in any pre-specified mapping of the device 100.

In another exemplary embodiment, the DSD 100 is configured to detect access activities performed by the host 131 and to subsequently determine its security threat level based on the extent to which the observed (detected) access activities match to one or more irregular activities which represent instances of malicious behaviour by a connected host. The degree to which a detected access activity $A_i$ matches to an irregular activity is represented by a respective access activity parameter value $p_i$ calculated by the DSD 100.

In some embodiments, the matching between the detected activities and the irregular activities is performed independently of any determination of the host-type of the host 131. That is, the irregular activities represent particular functionality that, when performed by a host, is considered to be abnormal or malicious irrespective of the expected activities, and therefore host-type, of the host. This enables the DSD 100 to determine the activity parameters without explicit knowledge of the particular host-type of the host, and/or the expected or prior access activities of the host. For example, the DSD 100 may determine host 131 as a rogue host based on detected data patterns indicating a particular malicious behaviour, such as reading the same logical data repeatedly and continuously, irrespective of the host-type of host 131 (i.e., where the detected behaviour is irregular since atypical host device would be expected to cache the initially read data).

In some embodiments, the irregular activities of the host may include any one of but not limited to any one of the following types: (i) one or more irregular commands submitted by the host, wherein the DSD 100 identifies a command as irregular based on one or more expected commands of the host; (ii) data thrashing of pre-fetched data of the host 131 exceeding a pre-decided system data thrashing threshold; and (iii) irregular data patterns of the host 131, which is decided based on a deviation between one or more observed data patterns and one or more learned data patterns. In some embodiments, the one or more learned data patterns may be obtained through a learning processes applied to the detected access activities.

The activity parameter value(s) determined for a detected activity, and with respect to the irregular activities, are weighted by corresponding impact weights. In some embodiments, the DSD 100 is configured to determine the impact weights based on the determination of the host type of the host 131, and/or the data activity patterns of the host 131. In response to a host with an unknown or yet to be characterized host type, the DSD 100 assigns default impact weights to the activity parameter value(s). Alternatively, the DSD 100 determines the one or more impact weights based on a determination the host type of the host, and/or the detected access activities performed by the host 131. In response to determining that the security threat level of a host is greater than or equal to a rogue host threat level, the access controller 110 may control the access activities of the host to safeguard itself.

In some embodiments, the DSD 100 is configured to analyze observed or expected values of the data access activities of one or more hosts 130, 131, and to generate one or more host behaviour profiles describing characteristics associated with host behaviour. The host behaviour profiles are represented by a collection of data values stored by the DSD 100, and/or by data values stored in an external computing system configured to receive the host behaviour data from the DSD 100. The DSD 100 is configured, in some implementations, to utilize a machine learning unit 230 to derive particular characteristics of the host behaviour from the observed, monitored, or recorded data patterns (i.e., access activity criteria values).

In some embodiments, the DSD 100 is configured to combine modes of operation to determine the security threat level of the host 131 by calculating activity parameters based on the expected access activity data of the host 131, and based on host-independent irregular activity data. For example, in embodiments where the DSD 100 cannot initially determine the host type of the host 131, such as in the case that the host 131 is not registered with the DSD 100, and where the DSD 100 has no prior activity pattern data to make a dynamic determination of the host-type, the DSD 100 may determine the security threat level of the host 131 using knowledge of the irregular activities and a default assignment of impact weights to the activity parameters. Then, following the accumulation of observed activity criteria values for the host 131, the DSD 100 may assign a host-type and determine future security threat levels of the host 131 based on data specific to the assigned host-type (e.g., by utilizing dynamically determined impact weights to determine the security threat level).

Data Storage Device (DSD)

FIG. 1a shows an embodiment of the DSD 100 comprising a data path 104 and an access controller 110. The data path 104 comprises a plurality of data ports 106 each configured to enable at least a data connection between a respective host computer system, such as hosts 130, 131, and the DSD 100. Each data port 106 includes control operations to translate interface protocols (e.g., USB to NVMe), and to provide other general device functionality. For example, in some embodiments the host computers 130, 131 are configured to include a device driver and a data interface for communicating with the DSD 100 over data port 106, which may be implemented as, for example, some form of USB port (e.g., USB-A, USB-8, USB-C, mini-USB, micro-USB, etc.), a Thunderbolt port, a Power over Ethernet (PoE) port, or a similar port.

The DSD 100 is configured to provide functionality to the host 130, 131 of a block data storage device. DSD 100 further comprises storage medium 108 to store user content data 109. The user content data 109 includes one or more blocks of data organized into files, for example including images, documents, videos, etc., according to a particular file system operable by the host 130, 131. The storage medium 108 is non-transitory such as to retain the stored block data irrespective of whether the medium 108 is powered. The medium 108 may be a solid state drive (SSD), hard disk drive (HDD) with a rotating magnetic disk, or any other non-volatile storage media. Further, the storage medium 108 may be a block data storage device, which means that the user content data 109 is written in blocks to the storage medium 108 and read in blocks from the storage medium 108.

In some embodiments, the DSD 100 includes a cryptography engine 107 configured to receive, interpret and execute commands received from host computer system 104 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, and other proprietary architectures. The cryptography engine 107 is connected between the data ports 106 and the storage medium 108 and is configured to use a cryptographic key to encrypt user content data 109 to be stored on the storage medium 108, and to decrypt the encrypted user content data 109 stored on the storage medium 108 in response to a request from the host 130, 131.

The connection of a plurality of hosts 130, 131 to the DSD 100 results in a multi-host operational environment for the DSD 100. When operating in such an environment, the DSD 100 seeks to maintain: i) the integrity of the data stored within the DSD 100, and (ii) the ability to provide access all authorized hosts with access to the stored data. In the described embodiments, hosts 130, 131 are authorized to perform operations on the DSD 100 for the purpose of utilizing the data storage capabilities of the DSD 100 (referred to as "access activities" as described herein). However, an authorized host 130, 131 may exhibit instances of malicious, undesired, or otherwise damaging behaviour in terms of the access activities performed by the host 130, 131 on the DSD 100. A host computer system operating in such a manner is referred to as a "rogue host" with respect to the DSD 100. The described embodiments refer to an exemplary configuration in which host 131 is a rogue host, while host 130 is a non-rogue host.

The access controller 110 is configured to secure the DSD 100 and accordingly the user content data 109 stored on the storage medium 108 against the behaviour of the rogue host 131 in the described dual-host environment. That is, according to the methods described herein, the access controller 110 detects data access activities of hosts 130, 131 via data ports 106, determines instances of rogue behavior based on the detected access activities of host 131, and subsequently controls the access activities performable by the host 131 (i.e., following its determination as a rogue host) such as to protect the DSD 100.

In some examples, the data storage device 100 includes one or more input components 102 configured to accept an input from the user 101. The input components 102 may also include one or more communications devices, such as a wireless modem, configured to receive and transmit data wirelessly via the transmission of electronic messages in a predetermined form. For example, this enables the DSD 100 to receive input data, such as host configuration data, from an external device of a user 101.

Figure 1B:
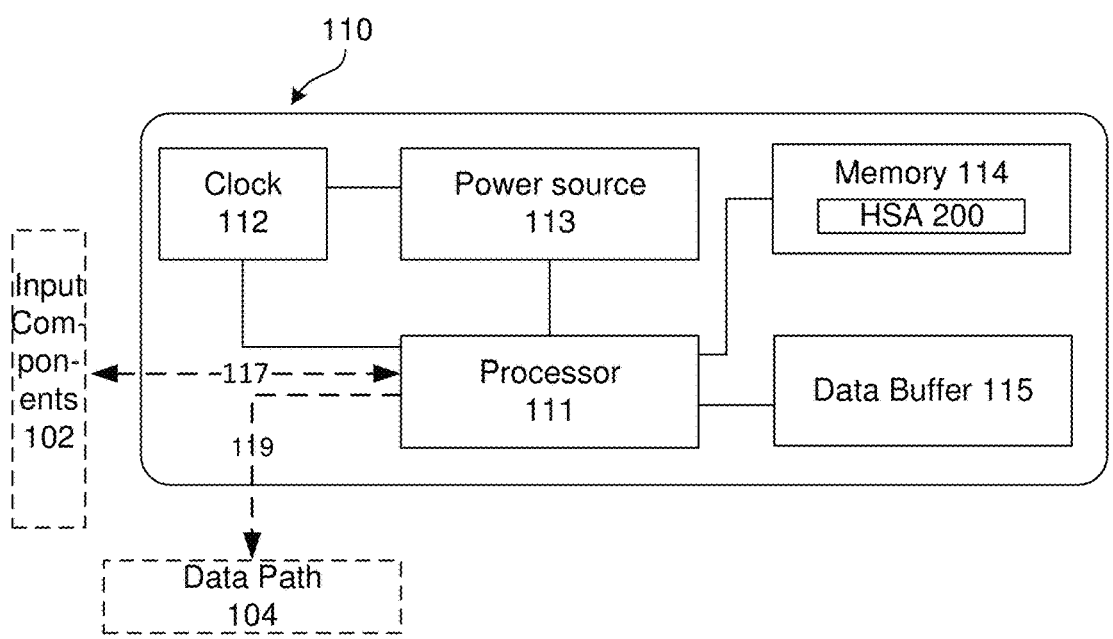
FIG. 1*b* illustrates a block diagram of an access controller of the example data storage device (DSD) according to one embodiment.

FIG. 1b illustrates an exemplary embodiment of the access controller 110 which includes: a processor 111; a clock 112 in communication with the processor 111; memory modules in the form of a system memory 114 and data buffer 115 configured to exchange data with the processor 111 and to store the data from the host 130, 131 temporarily; and a power source 113 in the form of an internal battery configured to power to supply power exclusively to components of the access controller 110. Data flows 117 and 119 exist between the processor 111 and the input components 102 and the data path 104 respectively. The processor 111 is configured to execute program code stored within the system memory 114 to issue commands for controlling the operation of the DSD 100.

The system memory 114 further includes a Host Security Application (HSA) 200 to enhance the security of DSD 100 against the behaviour of rogue hosts, such as host 131. The HSA 200 may be a microprogram executed by the access controller 110 to detect and process the access activities performed by a connected host 130, 131 based on the control commands and/or data passed through the data path 104 by the processor 111. Execution of the HSA 200 thereby enables the DSD 100 to identify the presence of one or more rogue hosts 131 from hosts 131, 130 connected to the DSD 100 in real-time and to subsequently control the future performable access activities of the rogue host 131.

Figure 2:
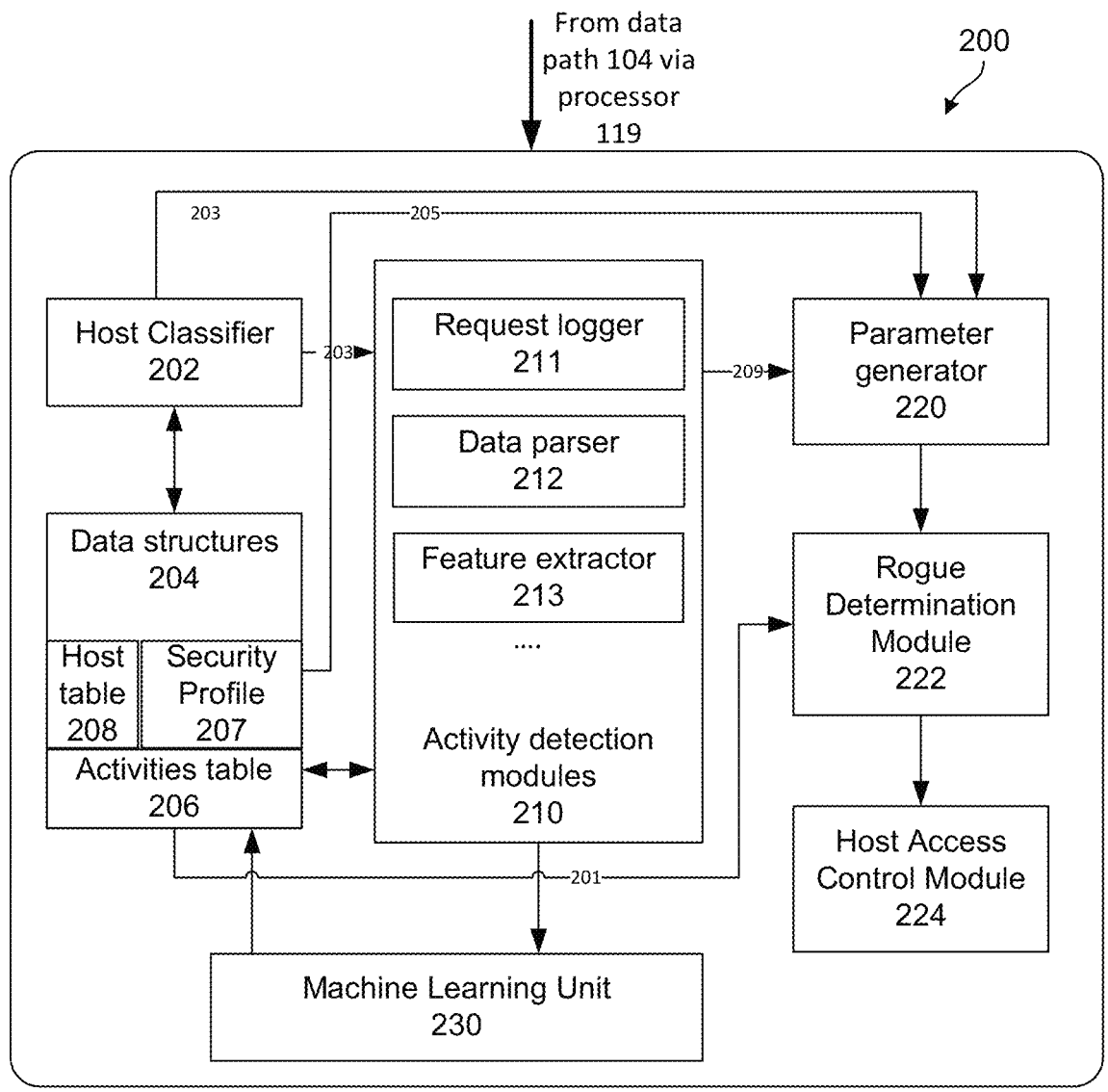
FIG. 2 is a block diagram of an exemplary configuration of a host security application (HSA) executed by the controller according to one embodiment.

FIG. 2 illustrates an exemplary configuration of the HSA 200 including: a host classifier module 202; one or more activity detection modules 210; one or more data structures 204; a parameter generator module 220; a rogue determination module 222; and a host access control module 224. In some embodiments, the HSA 200 also includes a machine learning unit 230 configured to execute one or more learning algorithms on observed data values associated with the access activities of the host 131 and to update data stored in the structures 204 accordingly.

The activity detection modules 210 of the HSA 200 detect, monitor and/or process the access activities of the connected hosts 130, 131 by processing the data stream 119 passed through the data path 104 in response to a host 130, 131 performing a data access activity on the DSD 100. Detection modules 210 are adapted to process data stream 119 to generate data associated with the access activities detectable by the HSA 200, referred to as observation values of corresponding activity criteria. In the described embodiments, the detection modules 210 include: a request logger 211 configured to recognize one or more data access requests from the host 130, 131 in stream 119; a data parser 212 to parse activity data transferred between a host 130, 131 and the DSD 100, including characteristic data elements such as signatures; and a feature extractor 213 configured to analyze and extract features from the control commands or activity data of the stream 119.

The activity detection modules 210 perform the activity detection and processing operations to provide an indication of access activities A and corresponding activity criteria observations o, based on activity configuration information stored in an activities table 206 of the data structures 204 module. The activities table 206 is configured to store information enabling the detection and processing of the access activities of the host 130, 131. In some embodiments, the activity detection modules 210 are configured to store at least some of the generated activity criteria observations o in the activities table 206, and/or to provide the observations o to the machine learning unit 230.

The data structures module 204 also includes a host table 208 configured to record and store information of one or more hosts 130, 131 that are presently connected, or that were previously connected, to the DSD 100. For example, with respect to a particular host 130, 131 the host table 208 may store host data including: a host ID or other value uniquely identifying the host from all others connected to the DSD 100; system data of the host including indications of hardware and/or software characteristics associated with the host; and host-specific connection data indicating properties of the connection between the host and the DSD 100. In other embodiments, the activities table 206 and the host table 208 may be organized as a list, array, or any other data structure that is suitable to store the respective activity and host related data.

The data structures module 204 also includes a security profile 207 configured to store the security information of the DSD 100, including system security information such as one or more threshold values indicating a maximum tolerance of the DSD 100 to a security threat posed by the access activity behaviour of a particular connected host 130, 131, and impact weight policy data indicating a policy for the dynamic assignment of impact weights to assessments of security threat attributed to the detected access activities of a host (i.e., defined by one or more access activity parameters, as described herein). In some embodiments, the security profile 207 is implemented as a table or list in a corresponding system security file or data block. In other embodiments, the profile 207 is stored in a data structure held dynamically in the memory 114, and accessible by other applications executed by the controller 110.

The data stored by the security profile 207 includes fixed data values, such as for example a global security threat level threshold value used to determine whether a particular host 130, 131 is a rogue host (referred to as the rogue host threat level). In some embodiments, the security profile 207 also includes host-variable data values, such as accessibility permission data determining the permission of particular host-types to perform particular data access activities.

Host classifier 202 module determines the host-type of the host 130, 131. In some embodiments, the host classifier 202 may communicate with the data structures module 204, and the host table 208 and activities table 206. In some embodiments, the host classifier 202 performs a host-type determination using a pre-specified mapping stored in the host table 208. Alternatively, the host-type determination may be based on the analysis and processing of the data stream 119, other host information stored in the host table 208, and/or the access activities recorded in the activities table 206.

In some embodiments, the host classifier 202 may provide the determined host-type to the activity detection modules 210 through a data flow 203 to assist the detection and processing of the access activities. Specifically, the activity detection modules 210 may utilize an indication of the host-type of host 131, as determined by the host classifier 202, to motivate the detection of particular access activities performed by the host 131. For example, the activity detection modules 210 may be configured to process an indication of the host-type of the host 131, as determined by the host classifier 202, and detect possible file system attacks performed by the host 131 on the DSD 100. In one implementation, this may occur by the activity detection modules 210 detecting a file system data write activity, or a corresponding request to perform this activity, and parsing the data to check whether the updates are on par with the expected updates (e.g., based on the nature of data routing in a Transport media).

For example, if the data is expected to be routed in a transport layer for delivering data to the appropriate application process on the host 131, the expected updates may be based on transport protocols such as Transmission Control Protocol (TCP), User Datagram Protocol (UDP), Datagram Congestion Control Protocol (DCCP) and the Stream Control Transmission Protocol (SCTP). If the updates appear to be routed in other layers (e.g., a network layer or session layer), the activity detection modules 210 may detect the updates as rogue or irregular.

In some embodiments, the data structures module 204 is also configured to store data generated by the host classifier 202 including: host-type data indicating a host-type of one or more hosts known to the DSD 100 (e.g., host 130, 131).

In some embodiments, the activity detection modules 210 are configured to provide activity criteria observation data to the machine learning unit 230 and to the data structures module. In some embodiments, the activity detection modules 210, machine learning unit 230 and data structure 204 combine to provide a feedback loop for dynamic adjustment of particular data generated and stored by the HSA 200, such as the expected activity criteria values of a host-type, and the dynamic security information in security profile 207, such as the impact weights and the rogue host threat level.

The activity detection modules 210 further communicate with a parameter generator 220 via a data flow 209 to provide the generator 220 with access activity criteria values corresponding to the detected activities for the host 131. The parameter generator 220 may include calculation circuits or components, such as adders, binary multiplier and/or advanced Field Programmable Gate Arrays (FPGAs) with powerful calculation capabilities. The parameter generator 220 measures and quantifies the input data from activity detection modules 210 according to one or more observed activity measurements o. The parameter generator 220 may also compare the observed activity measurements o with expected activity measurements e. The parameter generator 220 is configured to generate one or more access activity parameters p that indicate the extent of the deviation for a particular type of access activity. The parameter generator 220 is configured to apply a set of dynamically adjustable impact weights and generate the security threat level of the host 130, 131.

The rogue determination module 222 compares the security threat level of the host 131 with the rogue host threat level retrieved from the security profile 207. The rogue determination module 222 may include comparator circuits or components to compare the numerical values of the security threat level and the rogue host threat level. For example, if the rogue determination module 222 determines that the security threat level is greater than or equal to the rogue host threat level, the access activities of the host 130, 131 may be determined as rogue behaviour.

In response to determining the rogue behaviour, the host access control module 224 controls the access activities of the host to safeguard the DSD 100 in different ways, including: (i) initiating an intimation to the host 130, 131; (ii) conducting one or more rule-based data flushes; (iii) re-authenticating the host 131; (iv) re-evaluating the host-type of the host 131 if the host 131 is re-authenticated; (v) reducing one or more levels of accessibility permissions; and (vi) blacklisting the host 131. The controlling methods provide various system-level and DSD-specific handling ways against potential rogue host behaviour.

Dynamic Detection of a Rogue Host Based on Host-Type

Figure 3A:
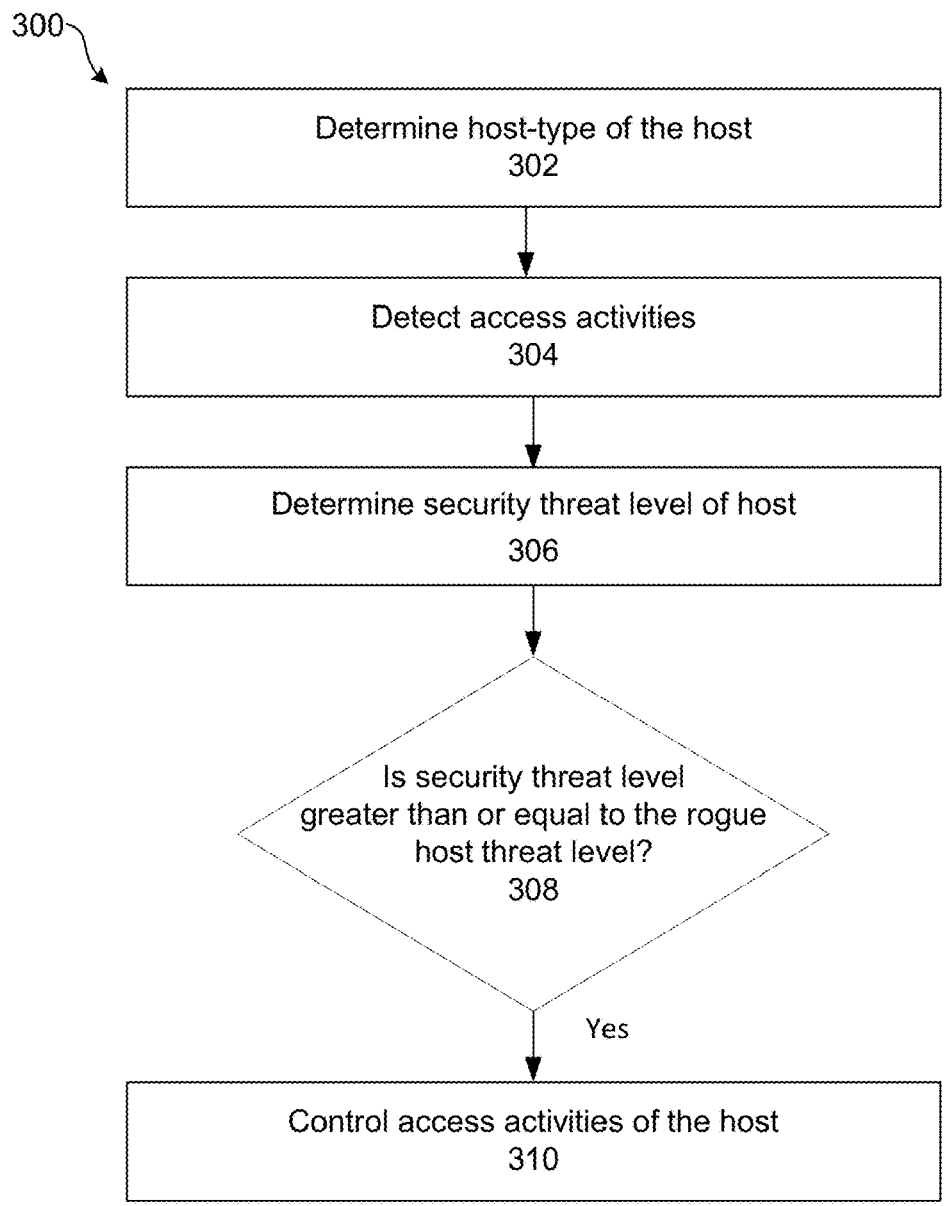
FIG. 3*a* is a flow diagram of a process for securing the DSD against rogue behaviour by a host according to one embodiment.

FIG. 3*a* illustrates a process 300 for securing the DSD 100 against rogue behaviour by a host, as executed by the access controller 110. Embodiments of the process 300 described herein relate to the detection, processing, and control of access activities performed by the rogue host 131 in the multi-host environment provided by the connection of hosts 130 and 131 to the DSD (i.e., via data ports 106 as depicted in FIGS. 1*a*, 1*b* and 2). In other examples, another host, such as host 130, may operate as a rogue host.

Figure 3B:
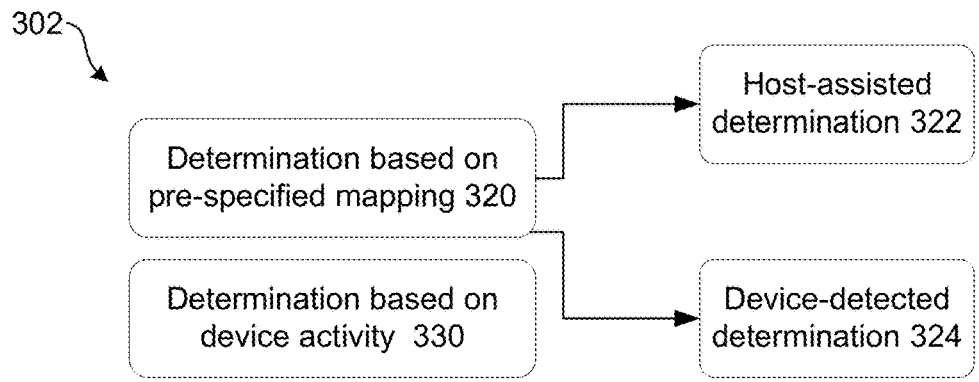
FIG. 3*b* is a block diagram of host-type determination methods according to one embodiment.

At step 302, the host classifier module 202 determines a host-type of the host 131. As shown in FIG. 3*b*, the determination of the host-type of host 131 may be performed based on a pre-specified mapping 320. In such implementations, the host classifier 202 retrieves mapping data from the data structures module 204, enabling the module 202 to perform a host-assisted determination sub-process 322, or a device-detected determination sub-process 324, to identify the host-type.

Figure 4A:
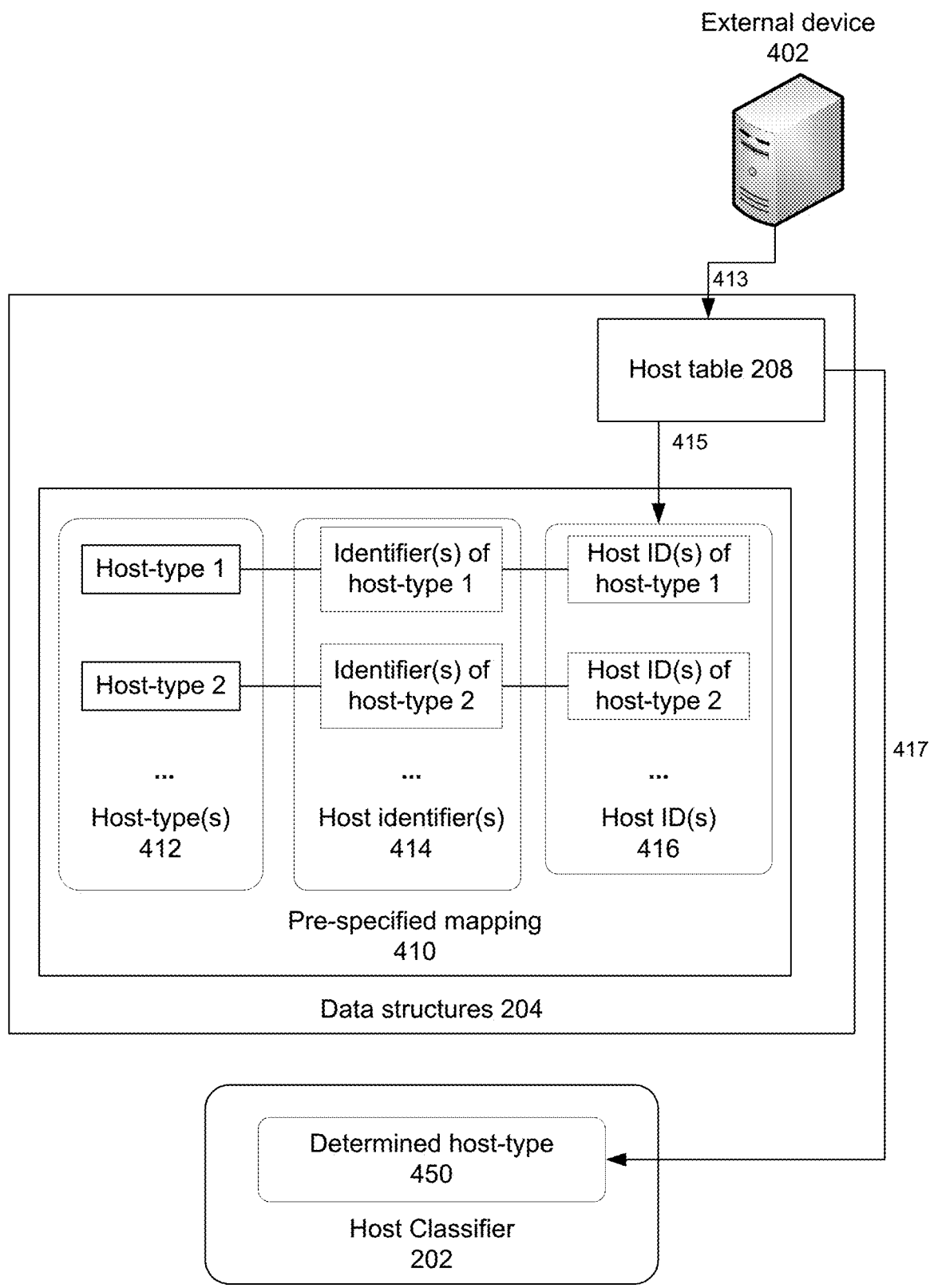
FIG. 4*a* is a block diagram of an exemplary configuration of elements of the HSA performing host-assisted host-type determination according to one embodiment.
Figure 4B:
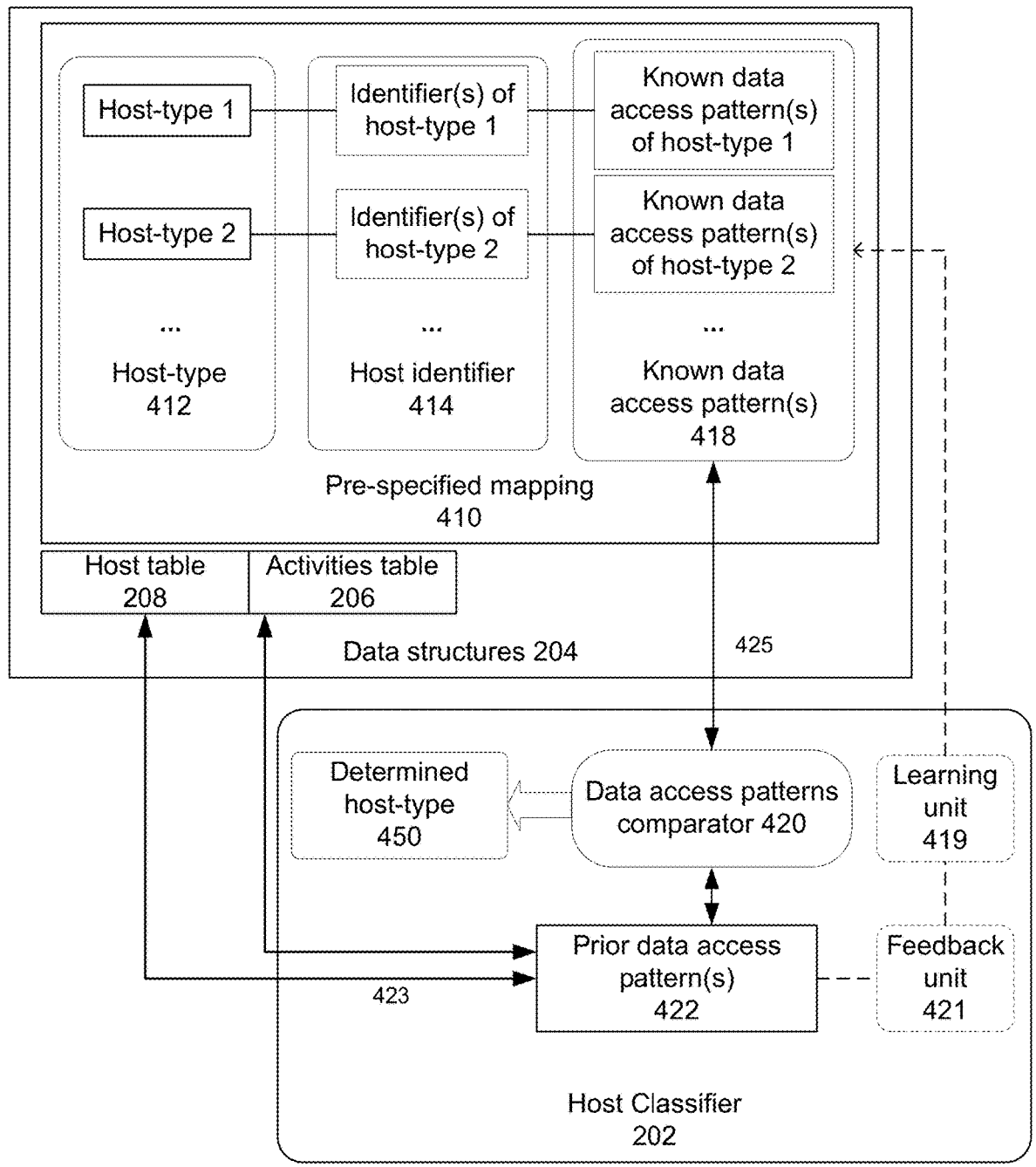
FIG. 4*b* is a block diagram of an exemplary configuration of elements of the HSA performing device-detected host-type determination according to one embodiment.

FIG. 4*a* illustrates a block diagram representation of an exemplary configuration of the data elements stored by data structures module 204 to implement the host-assisted determination 322. The host-assisted determination 322 is based on a pre-specified mapping 410, including an indication of one or more host-types 412 associated with at least one identifier 414 for each host-type 412. The host identifier(s) may include any one or more of Host ID(s) 416, signatures and known data access patterns (as shown in FIG. 4*b*). The pre-specified mapping 410 may be implemented in different forms, such as a table, a list or a data sheet. The pre-specified mapping 410 may be stored in various document types such as Excel Workbook, XML, PDF, TXT and CSV.

In the described embodiments, the data structures module 204 is configured to store host-types 412 including, but not limited to: (i) gaming hosts, configured to manage video games involving one or more players and may randomly read or write in define chunks (e.g., 64K); (ii) surveillance hosts, configured to manage and analyze surveillance media data; (iii) fully-sequential-writing-only hosts, configured to provide sequential reading and writing operations of data and are advantageous in transmitting large files; (iv) writing-unrestricted hosts, for which unrestricted rewriting or over-writing of data is enabled; (v) deleting-unrestricted hosts, for which unrestricted deletion of data is permitted; and (vi) access-unrestricted hosts for which unrestricted reading, writing, overwriting and deleting of data is enabled. In one example, host-types 412 is implemented as a table with row entries corresponding to each of the identified hosts (i)-(vi) above (e.g., including a textual description and a key value).

During the host-assisted determination 322, an external device 402, e.g., a master host computer, may register one or more host IDs recorded by host table 208 to the host identifier(s) 414 of one host-type 412. Then the host classifier module 202 retrieves the registration data from host table 208 via a data flow 417 to assist the host classifier 202 in generating the determined host-type 450.

FIG. 4*b* illustrates a block diagram representation of an exemplary configuration of the data structures 204 and host classifier 202 modules of the HSA 200 to implement the device-detected determination 324 process. In some implementations, one type of the host identifier(s) 414 may be known data access pattern(s) 418 indicative of the regular data usage of the host-type 412. In the described embodiments, a data access pattern is defined based on one or more data access activity criteria. For example, it may be known that in surveillance applications, data transferred through the data path 104 between DSD 100 and a surveillance host includes a Moving Picture Experts Group (MPEG) sync byte pattern (i.e., due to its importance in the playback of media streams). Therefore, in this example the HSA 200 may define a data access pattern, for detecting the data transfer activity, which includes the criteria of whether the MPEG sync is present in the data of stream 119.

The host classifier 202 is configured pre-process the access activities information retrieved from the activities structure 206 and the host information retrieved from the host table 208, as transferred to the classifier 202 via a data flow 423. The host classifier 202 generates prior data access pattern(s) 422, which indicates the current data access activities in a similar format as the known data access patterns 418. A data access patterns comparator 420 compares the prior data access pattern(s) 422 with the known data access patterns 418 and generates the determined host-type 450.

In some embodiments, the host classifier 202 further includes a learning unit 410 and a feedback unit 421 to update the known data access pattern(s) 418 in the pre-specified mapping 410 by analyzing and learning from the prior data access pattern(s) 422.

In some embodiments, the host classifier 202 is configured to perform host-type determination based on device activity (i.e., according to sub-process 330). The host classifier 202 is configured to retrieve the data from the host table 208 and the activities table 206 irrespective of any pre-specified mapping. The device activity based host-type determination process 330 enables the HSA 200 to characterize a host-type of a host, where the host-type is not defined in the pre-specified mapping 410. This functionality improves the capability of the DSD 100 to dynamically categorize a host 131 in that the host-type determination process is not reliant on pre-specified configuration data, and thereby improves the ability of the DSD 100 to subsequently detect, process and control the data access activities of the host, in the multi-host environment.

Figure 4C:
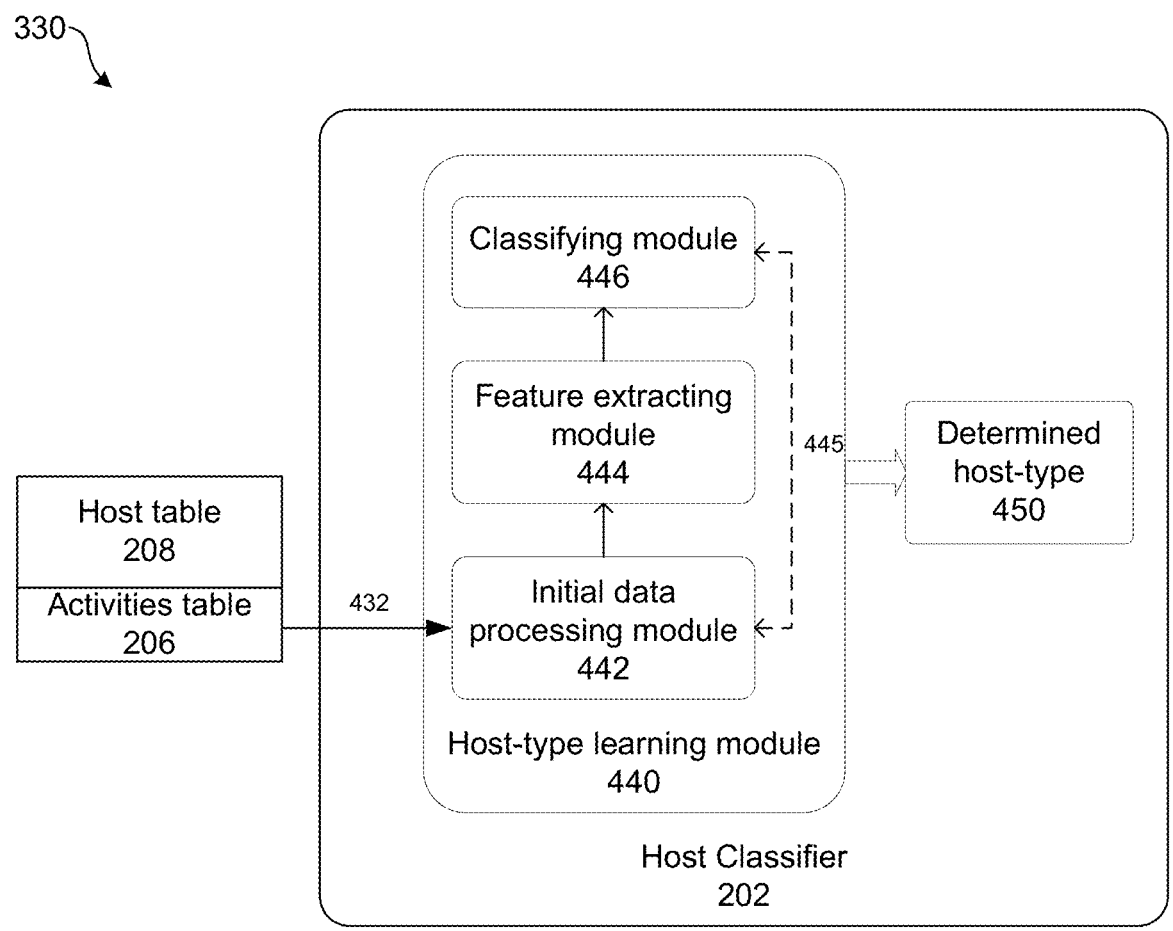
FIG. 4*c* is a block diagram of an exemplary configuration of elements of the HSA performing a device activity based host-type determination according to one embodiment.

FIG. 4*c* illustrates a block diagram representation of an exemplary configuration of the host classifier module 202 to implement the device activity based host-type determination process 330. The host classifier 202 includes a host-type learning module 440 configured to retrieve the access activity data from the activities table 206, and host data from the host table 208, irrespective of the pre-specified mapping 410.

In some embodiments, the host-type learning unit 440 may include an initial data processing module 422 to process the raw data from the host table 208 and the activities table 206, such as by implementing a noise reduction or sample pruning process. The host-type learning module 440 may also include a feature extracting module 444 that extracts features related to one or more host-types, which may be a host-type defined in the pre-specified mapping 410 or a new host-type. The host-type learning unit 440 may further include a classifying module 446 to classify the features to output the determined host-type 450. There may also be a feedback loop between the classifying module 446 and the initial data processing module 442 that may improve the output result of the determined host-type 450.

With reference to FIG. 3, at step 304 the HSA 200 detects the access activities of the host 130, 131. The host classifier 202 is configured to provide an indication of the host-type of host 131 to the activity detection modules 210 through a data flow 203. In response to receiving the host-type indication, the HSA 200 configures the activity detection modules 210 to scan for the presence of particular data access activities A (i.e. based on the data of regular activities of the host-type, as stored in data structures module 204). In other configurations, the detection of data access activities by the activity detection modules 210 is independent of the host-type. For example, the activity detection modules 210 may scan for all, or a subset, of the configured data access activities irrespective of whether host 131 is a gaming host or a surveillance host.

Figure 5A:
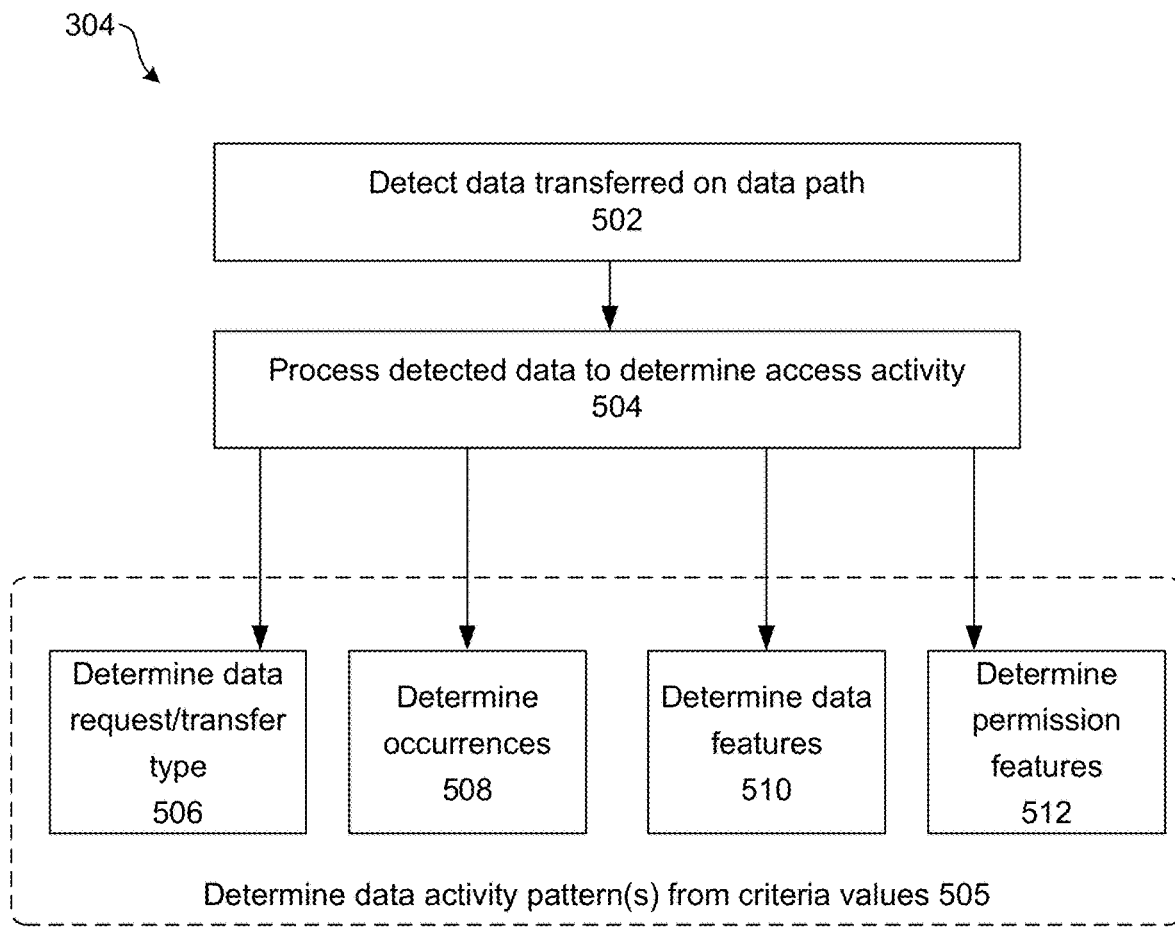
FIG. 5*a* is a flow diagram of a process for detecting access activities performed by a host on the DSD according to one embodiment.

FIG. 5a illustrates a process 304 for detecting the access activities of the host 131. At step 502, the HSA 200 detects data flow 119 occurring between the DSD 100 and the host 131 on data path 104 (as shown in FIGS. 1 and 2). At step 504, the data flow 119 detected in step 502 is processed by the access controller 110. In the described embodiments, data flow 119 includes one or more of: i) control commands issued by the host 131 to the DSD 100, or vice versa; and ii) activity data representing a data transfer between the host 131 and the DSD 100, where the activity data is in the form of one or more sequences of bytes or bits with a specified maximum length (the block size).

The activity detection modules 210 are configured to process data stream 119 to identify the presence of particular control commands or activity data and to detect an access activity including: a data access request ($A_{request}$); a logical region access ($A_{LRB}$); and a data transfer ($A_{transfer}$). In other embodiments, the activity detection modules 210 may be configured to detect other access activities representing any arbitrary operation or function performable by the host 131 on the DSD 100.

Following the determination of an access activity A, the activity detection modules are configured to generate activity criteria observation values to assess the behaviour of the host 131 with respect to the determined activity. In the described embodiments, the modules 210 determine data activity patterns (or "data patterns") from the values of one or more of the activity criteria (i.e. sat step 505).

At steps 506 to 512, the access controller 110 determines observed access criteria values for the detected access activities. At step 506, the modules 210 determine the type of the detected access activity, such as for example whether the detected data access request $A_{request}$ is a read request or a write request. The value of the criteria is a binary '0' or '1' indicating read or write respectively.

At step 508, the modules 210 determines a value for the number of occurrences of the detected access activity, such as for example as an integer value. In some configurations, the number of occurrences is determined over a time interval of a particular length (e.g., the number of read requests issued over a one minute interval).

At step 510, the modules 210 generate one or more data features representing one or more characteristics of the access activity. In some examples, the data characteristics are determined by a data parsing operation that examines one or more blocks of the activity data transferred through the data path 104. At step 512, the modules 210 generate one or more permission features representing a permission of the host to perform the access activity on the DSD 100.

Figure 5B:
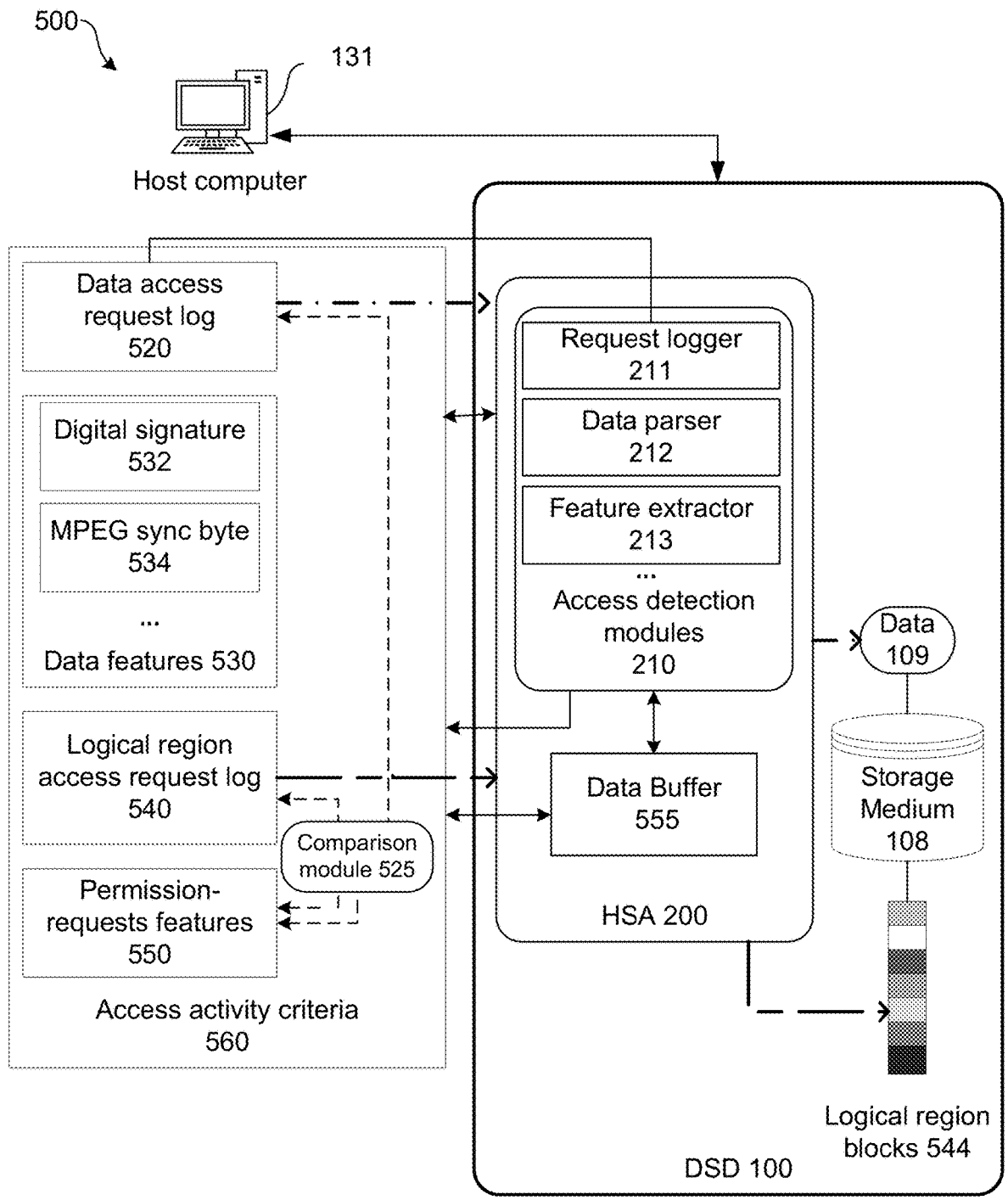
FIG. 5*b* is a block diagram of an exemplary configuration of the HSA to generate access activity criteria according to one embodiment.

FIG. 5b illustrates an exemplary configuration of the HSA 200 for the detection of access activities and the generation of corresponding activity criteria values. Referring back to the activity type and occurrence determination steps 506 and 508 in FIG. 5a, the request logger 211 is configured to detect a data request of the host 131 to access user data 109 stored within the storage medium 108 $A_{request}$, and to log the request by generating one or more activity criteria values (observation values o). The activity criteria values are stored in a request log 520 maintained by the HSA 200. The access requests performed by the host 131 can either be a random/direct access request to anywhere in the data file, or a sequential access request to particular data blocks sequentially.

In some embodiments, the HSA 200 is configured to maintain a separate logical region access request log 540 to store indications of detected logical region access requests $A_{LRB}$, and associated activity criteria values. The request logger 211 is configured to detect a logical region block access within data stream 119, such as for example in a control command which references one or more logical region blocks 544 in the storage medium 108, instead of particular data 109 of the storage medium 108.

Referring to the data feature determination step 510, the feature extractor 213 is configured to extract one or more data features 530 in association with the detected access activity. For example, for a data transfer activity $A_{transfer}$ the data features 530 may include an indication, or representative values of, a digital signature 532 and a MPEG sync byte 534 exchanged between the DSD 100 and the host 131.

Other characteristic features may include playback features, which represent whether one or more other blocks of data conform to a data type indicated as able to be played back according to a particular format (e.g. as indicated by a sync byte 534 or similar data type marker). For example, the presence of the sync byte 534 may indicate that playback/decode of the activity data is not possible.

In some embodiments, the feature extractor 213 is configured to check for periodicity, or an occurrence at a particular time, of a sync byte 534 or other data element. For example, a data feature may be generated indicating an absence of periodicity of an initially detected sync byte, or that the initial sync byte is missing.

Referring to the permission feature determination step 512, activity criteria generated by the HSA 200 may include permission-request features 550 indicating a permission of the host 131 to perform the detected access activity on the DSD 100. In some embodiments, the permission request features indicate a relationship between one or more data access permissions for the host 131 on the DSD 100 and the data access requests stored in the access request log 520 and/or the logical region access request log 540. The relationship between the data access permissions 550 and data access requests stored in the access request log 520 and/or the logical region access request log 540 may be derived by a comparison module 525.

In some embodiments, the HSA 200 is configured to store the activity access criteria values 560 in a data buffer 555. Use of data buffer 555 enables the detection modules 210 to generate the criteria observations, including the one or more data features, by conducting processing or comparison operations (e.g., data parsing of the access activity data) prior to storage of any of the access activity data in the DSD 100.

With reference to FIG. 3a, at step 306 the HSA 200 determines the security threat level of the host 131. The parameter generator 220, as depicted in FIG. 2, is configured to determine the one or more access activity parameters $p=p_1 \ldots p_Q$ as numerical values that quantify the extent to which the detected access activities A result in the host 131 posing a security threat to the DSD 100. In the described embodiments, a single parameter value $p_i$ is calculated to provide an indication of the deviation between a corresponding detected access activity $A_i$ of the host 131 (e.g., a data read request) and an associated expected access activity of the determined host type of host 131. In other embodiments, multiple activity parameters may be computed in response to the detection of a single access activity, and these parameter values may be combined (e.g., numerically), or otherwise resolved, into a single consolidated value to which impact weights are applied, according to the methods described below.

Parameter generator 220 receives, from the activity detection modules 210, activity criteria values in the form of a set of one or more observation feature vectors o. Each observation o represents N activity criteria values determined for detected activity A by the modules 210. One or more feature vectors may represent a data pattern modelling the behaviour of the host 131 with respect to the detected access activity A. The parameter generator 220 also retrieves expected values e of the one or more corresponding activity criteria used to assess activity A. In some embodiments, the expected values e are determined based on the host-type of host 131.

Figure 6:
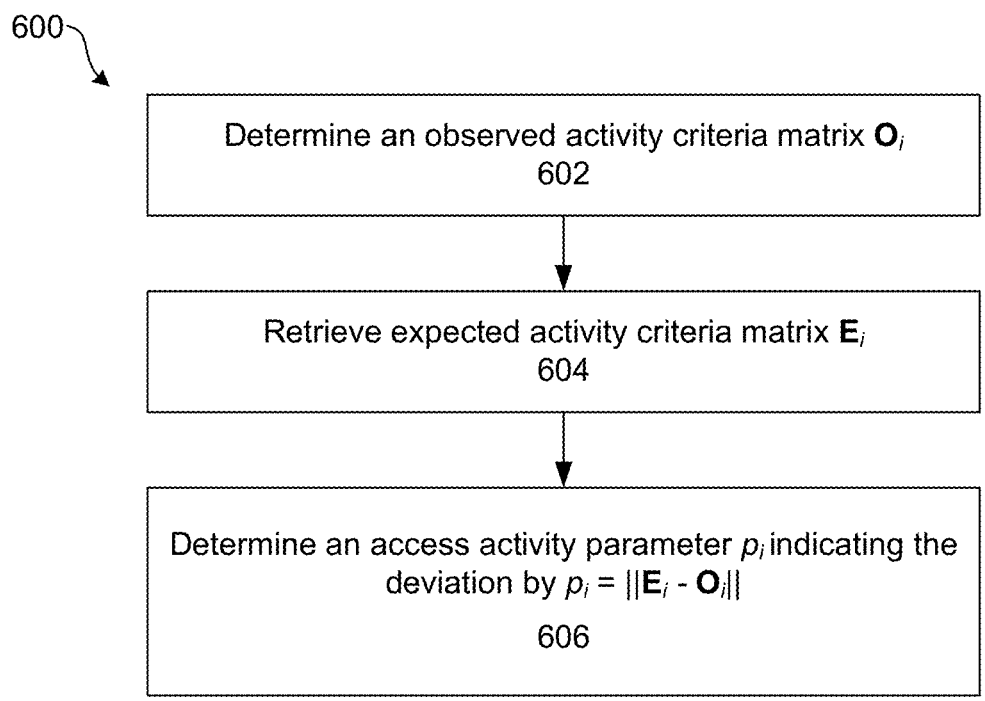
FIG. 6 is a flow diagram of a process for determining access activity parameters according to one embodiment.

In some embodiments, the observed and expected access criteria values (i.e., data patterns) are represented as an activity criteria matrix $O_i$ and an expected activity matrix $E_i$ respectively. FIG. 6a illustrates a sub-process 600 of the step 306 to determine the i-th access activity parameter $p_i$. In some embodiments, the observed and expected access criteria values (i.e., data patterns) are stored in the data structure 204 module as an M×N activity criteria matrix $O_i$ and a corresponding expected activity matrix $E_i$ respectively (as determined by steps 602 and 604). M and N may be any positive integers corresponding to the number of observed or expected patterns (M) and the number of criteria comprising each pattern (N). Each element $o_{mn}$ of $O_i$ may represent an activity value under an individual criteria to assess the access activities, and each element $e_{mn}$ of $E_i$ may represent an expected value under the individual criteria. In some embodiments, the expected activity matrix $E_i$ is stored in the data structures module 204, and the value for each element of $E_i$ may be dynamically changing according to the dynamic adjustment of the expected activities.

In the embodiments where M=N=1, the expected and observed activities are measured according to a single measured value of a single criteria. In the embodiments where M>1 or N>1, $E_i$ and $O_i$ are measured according to multiple criteria and/or observations, wherein particular calculations (e.g., windowing functions) may be implemented for the measurement of the behaviour of the host 131 over time.

The parameter generator 220 calculates a numerical value for each parameter $p_i$ an indication of a deviation between the observed criteria values and the expected criteria values. In the described embodiments, $p_i \in [0, \infty)$ with larger values indicating a larger deviation (and hence a higher security threat compared to an activity with a smaller $p_i$). In some embodiments, as shown in step 606, the access activity parameters $p_i$ are calculated by $S=\|O_i - E_i\|$ where $\|\cdot\|$ denotes a norm notation which may be any one of but not limited to the absolute-value norm, the Euclidean norm and the p-norm, measuring the deviation mathematically.

In other embodiments, the $p_i$ values are determined by the application of a regression, pattern classification, or learning technique. In some such embodiments, the values of expected activity matrix E may represent the parameters of a corresponding access activity model $\lambda$, as determined during a model training operation. For example, $\lambda_{request}$ may be a model representing the expected behaviour of a host for the data access request activities $A_{request}$. In such implementations, the expected activity matrix E provides parameters defining the corresponding distributions of one or more criteria values, as determined during a training process. The activity models $\lambda$ may be universal system level models, or host-type specific models, according to the training process performed. Activity parameter $p_i$ is generated, for access activity $A_1$, based on the determination of a classification output from scoring activity criteria observations o (e.g., the values measured from the detected activity of the host) on the activity model $\lambda$. In some embodiments, the machine learning unit 230 is configured to update the values of the expected activity matrix $E_i$ and therefore the parameters of the trained models, dynamically based on the detected criteria value(s) of criteria matrix $O_i$ (i.e., according to a feedback learning process).

Figure 7:
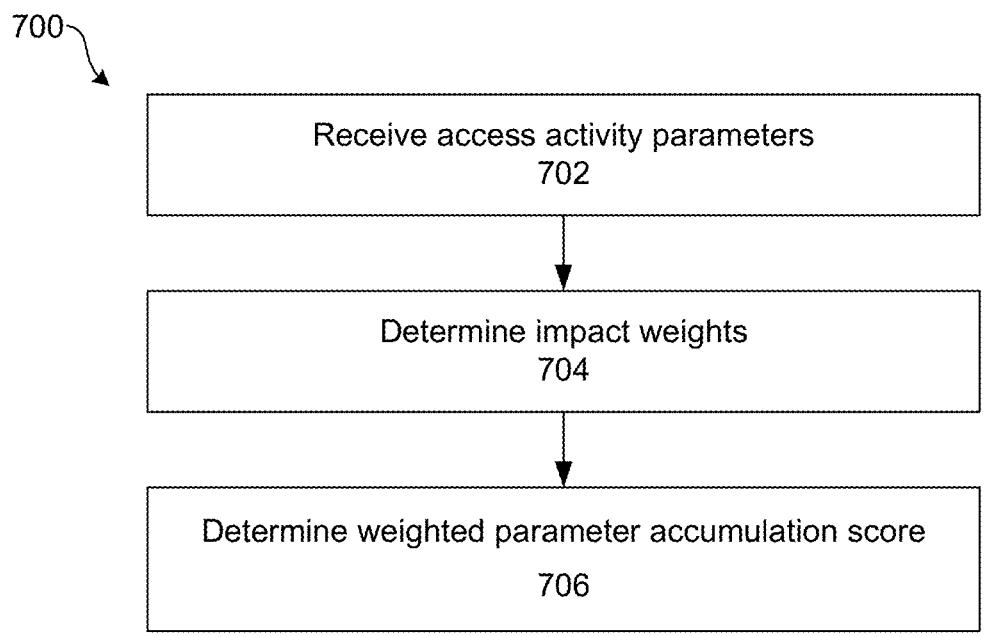
FIG. 7 is a flow diagram of a process for producing a security threat level value according to one embodiment.

FIG. 7 illustrates a sub-process 700 performed by the parameter generator 220 to determine a security threat level of the host 131, by weighting the access activity parameters by one or more impact weights. At step 702, the parameter generator 220 retrieves the activity parameters $p_i, \ldots, p_V$, as determined for each of V detected access activities $A_1, \ldots A_V$ performed by host 131 on DSD 100. In some embodiments, parameters $p_i, \ldots, p_V$ are retrieved from data structures 204 or from an internal data buffer of generator 220.

At step 704, the parameter generator 220 retrieves the impact weights $w_1, \ldots, w_V$ from the security profile 207 of the data structures 204 through a data stream 205. The impact weights are non-negative real numbers. The value of the i-th impact weight $w_i$, relative to all other impact weights $w_j, j \neq i$ determines the significance of the i-th access activity parameter $p_i$ in the calculation of the security threat level value $L_h$ for host 131. Advantageously, the impact weight $w_1$ assigned to a corresponding activity parameter $p_i$ is determined dynamically according to the host-type, as determined by the host classifier 202. The adjustable impact weights enable the flexible and dynamic adjustment of the impact of each type of access activities performed by the host 131 on the DSD 100. For example, for a surveillance host 131, random data reads are not expected (since the host 131 is normally configured to write captured video/image data to the DSD 100, but not to read any data from the DSD 100). In other implementations, the periodicity of the data write and/or read requests may be detected and analyzed, on the basis that surveillance host 131 will read and/or write data in a more predictable manner compared to another type of host. In this case, the impact weight assigned to a data read request activity and/or a data transfer involving data following from the DSD 100 to the host 131, may be high to improve the sensitivity of the DSD 100 to detect the abnormal behaviour from surveillance host 131.

In the described embodiments, the security threat level is represented numerically by a weighted parameter accumulation score value $L_h$. As illustrated at step 706, in such embodiments, the security threat level $L_h$ is determined by multiplying each activity parameter $p_i$ with a corresponding impact weight $w_i$, for example, $L_h = \Sigma_i w_i p_i$.

With reference to FIG. 3a, at step 308 the rogue determination module 222 determines whether the security threat level $L_h$ of the host 131 is greater than or equal to a rogue host threat level $L_{rogue}$, and if so, at step 310 controls the future access activities that are performable by the host 131 on the DSD 100. This enables the DSD 100 to dynamically assess, based on the determined security threat level $L_h$, whether to safeguard itself against the host 131. In the described embodiments, the rogue host threshold level $L_{rogue}$, is a numerical value enabling a direct arithmetic comparison to the corresponding determined security threat level $L_h$. If $L_h < L_{rogue}$ then the host 131 is considered by the HSA 200 to be operating normally. Otherwise, the host 131 is considered to be a rogue host such that host access control module 224 is invoked to control its future access activities. This facilitates an improvement in the security of the DSD 100, in the given multi-host environment, by dynamically constraining the behaviour of a malfunctioning host 131.

In some embodiments, the rogue host threshold level $L_{rogue}$ is a system value stored in the security profile 207 of the data structures 204. The system value $L_{rogue}$ may be adjusted by the rogue determination module 222 to account for a particular operating state of the DSD 100. For example, the $L_{rogue}$ value may be decreased such as to increase the sensitivity of the device 100 to potential rogue behaviour if one or more conditions are met (e.g., where the number of connected hosts exceeds some pre-specified value). In some embodiments, the value of the rogue host threshold level $L_{rogue}$ based, at least in part, on the host-type of host 131, and/or the access activities of host 131. For example, the rogue determination module 222 may be configured to increase the threshold level $L_{rogue}$ for a surveillance host such that a greater deviation between observed and expected activity patterns is required to determine the host as a rogue, compared to a host of a different type.

Detecting a Rogue Host of Unknown Type

Referring back to FIG. 3a, in some embodiments the activity parameters $p_i$ for a detected access activity $A_i$ performed by the host 131 are determined by calculating an indication of a match between the detected access activity (as represented by the observation activity patterns o) and one or more irregular activities. In such embodiments, the activities table 206 of the data structures 204 is configured to store expected activity criteria $e^R$ of one or more irregular activities $A^R$. The parameter generator is configured to determine the one or more activity parameters $p_i$ for each detected activity $A_i$ by matching the expected (irregular) activity criteria (patterns) $e^R$ against the corresponding observation criteria (patterns) $o_i$.

In some embodiments, the matching between the detected access activity and the irregular activities is performed in addition to calculating an indication of a deviation between the detected access activity and an expected access activity of the determined host type (e.g., by combining respectively calculated parameter values into a single activity parameter used to represent activity $A_i$). In other embodiments, the parameter generator 220 determines the activity parameters solely based on the irregular activity matching operation, and without requiring a prior determination of the host-type from the host classifier 202.

In the described embodiments, the parameter generator 220 is configured to check for irregular activities including: one or more irregular commands submitted by the host 131 to the DSD 100, wherein the identification of a command as irregular is based on one or more expected commands of the host 131; data thrashing of pre-fetched data exceeding a system data thrashing threshold; and one or more irregular activity patterns of the host 131. In some embodiments, the identification of an activity pattern as irregular is based on a deviation between one or more observed activity patterns of the host 131 (i.e., the criteria vectors o), and one or more known activity patterns of the host 131. In some embodiments, the one or more known activity patterns of the host 131 are obtained through a learning process applied to observed activity patterns.

For example, one or more irregular commands may include, in the data stream 119, the issuance of I/O commands (e.g., assessed as either the number of I/O commands issued in a time period, or the ratio of I/O commands to other commands, such as Admin commands), or commands effective to access a particular Namespace, system, or other secure partition of the DSD 100. For example, the HSA 200 may include front end (FE) and backend (FTL/PS) modules configured to process the admin and I/O commands respectively. This enables the DSD 100 to detect the ratio of the number of Admin commands to I/O commands for a particular Namespace and determine that the issuance of I/O commands is irregular if the Admin-to-I/O command ratio is higher than a pre-specified value.

In some embodiments, the HSA 200 may determine irregular activities based on one or more pre-defined rules stored in the data structures module 204. For example, for Enterprise servers, the HSA 200 may pre-set which days or which hours of a day may have more access activities, and determine requests sent at remote hours as suspicious activities. The HSA 200 may also input a set of not-to-serve IP addresses (such as 192.168.X.X) to control out-of-organization or out-of-country requests.

In some embodiments, the HSA 200 may determine irregular activities from the operation of the host 131. For example, the activity detection modules 210 may detect a sequence of particular data access requests from the host 131 being aborted in a pre-specified period (e.g., 60 seconds), thereby affecting the QoS of the another host 130 connected to the DSD 100.

In some embodiments, the HSA 200 may determine irregular pre-fetched data of the host 131. For example, the activity detection modules 210 may detect whether a pre-fetched data sequence is thrashed in a pre-specified period (e.g., 60 seconds). The HSA 200 may be configured to quantify the extent of pre-fetched data thrashing via performing a matching operation to known levels of irregular thrashing as represented by the expected irregular activity criteria data. In other embodiments, in response to the detection of pre-fetched data thrashing exceeding a pre-decided system threshold stored in the security profile 207, the HSA 200 may determine the behaviour of the host 131 as rogue (i.e., without a determination of an activity parameter and subsequent comparison to the rogue threshold level) and control the access activities accordingly. For example, the DSD may decide not to perform pre-fetch for the host 131 and put the backend resources for other hosts 130 or other backend activities.

In some embodiments, the HSA 200 may determine the expected irregular activity criteria values $e_i^R$ by applying machine learning to the observed activity patterns through the machine learning unit 230. The HSA 200 may be configured to associate the host 131 to one or more learned activity patterns obtained from the machine learning unit 230. For example, in response to determining the host 1341 as rogue, the activity criteria observations $o_i$ generated by the detection modules 210 may be stored as activity patterns of irregular activities, or otherwise utilized to adapt, create or modify one or more learned activity patterns for the irregular activities.

Further, an indication of a match between each regular activity and the corresponding irregular activity may be determined and calculated as access activity parameter values $p_i$ by the parameter generator 220. Similar to the determination based on host-type, in some embodiments, each activity parameter derived, at least in part, from matching observed activity patterns against known irregular activity patterns is assigned a dynamically adjustable impact weight $w_i$. For example, detected activities involving the host 131 submitting a sequence of particular commands (such as to affect QoS of the DSD) may have a higher impact weight compared to the thrashing of pre-fetched data. A security threat level $L_h$ indicative of an accumulated impact of the parameter values $p_i$ of the host 131 may be determined at the parameter generator 220. At step 308, the rogue determination module 222 compares the security threat level $L_h$ with the rogue host threat level $L_{rogue}$. In response to determining that the security threat level $L_h$ is greater than or equal to the rogue host threat level $L_{rogue}$, the access activities of the host 131 are controlled, at step 310.

Controlling a Rogue Host

With reference to FIG. 3a, in response to determining that host 131 is a rogue host (i.e., at step 308), the host access control module 224 implements one or more activity access control methods to safeguard the DSD 100 from the host 131 (i.e., at step 310).

Figure 8:
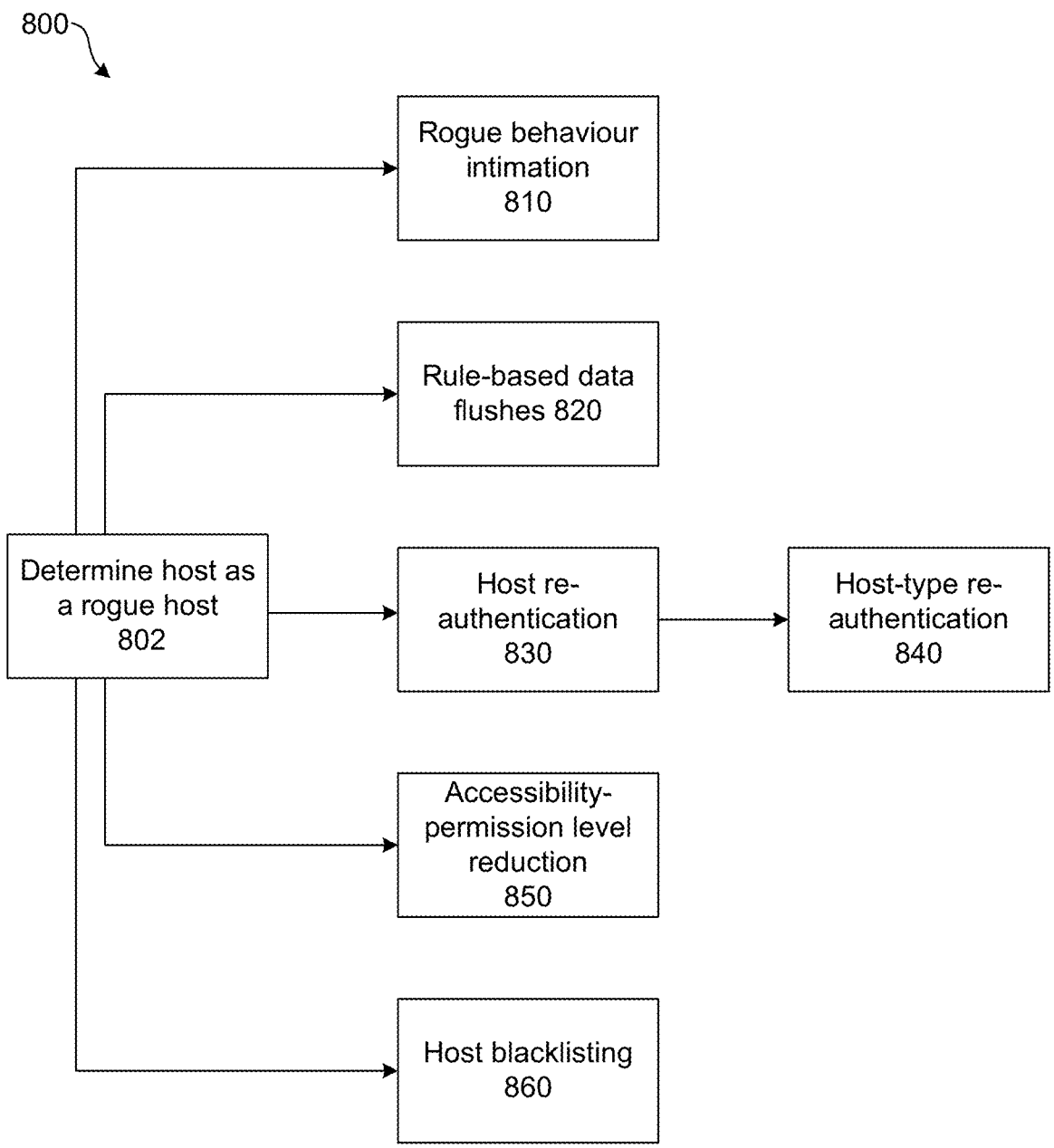
FIG. 8 is a flow diagram of a sub-process for controlling the access activities of the host according to one embodiment.

FIG. 8 illustrates operations that may be performed by the HSA 200 to control the access activities of the host 131 to safeguard the DSD 100. In response to determining that the host 131 is a rogue host, the rogue determination module 222 invokes the access control module 224 to exercise control over the future access activities performable by the host 131, and thereby safeguard the DSD 100.

In some embodiments, the host access control module 224 may initiate a rogue behaviour intimation 810, involving signaling the detection of rogue behaviour of the host 131 to another host such as a master host. In response to receiving the signal or indication of the rogue behaviour of host 131, the master host is configured to exercise control over the host 131, and/or the wider networked computing system including hosts 130, 131, with respect to the data access activities performed on the DSD 100. The rogue behaviour intimation may be configured on a need basis.

In some embodiments, the host access control module 224 is configured to conduct one or more rule-based data flushes 820. One exemplary data flushing operation may be conducted as follows. Prior to determining that the host 131 is operating normally (i.e., that the host is not a rogue host), for example, via a comparison of the security threat level $L_h$ to the rogue host threat level, the DSD 100 is configured to store data received from the host 131 in the data buffer 115 (e.g., RAM). In response to determining the host 131 as a non-rogue host, the host access control module 224 flushes the data to the storage medium 108, such as NAND, based on one or more pre-determined data flushing rules stored in the security profile 207. The rule-based data flushes 820 restrict non-verified data to be written into the storage medium 108, thereby potentially eliminating further processing operations that would otherwise be required to invalidate the data in the storage medium 108, and the later execution of garbage collection operations for the invalidated data segments. In some implementations, the rule-based data flushes 820 further enable task synchronization in a multi-host storage platform.

In some embodiments, the rules or signatures may be provided to the DSD 100 by the host 131 for the purpose of implementing the rule-based data flushes 820. In some implementations, the buffer 115 is configured to specify a storage area with an upper size threshold (e.g., 1 Megabyte in the T-RAM) for storing the rules or signatures. In response to the upper size threshold being reached by an access activity, such as a data transfer activity $A_{transfer}$, the host access control module 224 is configured to inform one or more other modules of the HSA 200.

In some embodiments, the host access control module 224 is configured to initiate a host re-authentication process 830 to re-authenticate the host 131 by verifying the authentication information of the host 131. For example, the verification of the re-authentication information may include the processing of one or more authentication signatures, and/or one or more identities of the host 131. The host re-authentication process 830 provides an opportunity for the host 131 to authenticate itself with the DSD 100, on which the rogue status determination of the host 131 may be reset by HSA 200.

In some embodiments, the host access control module 224 is configured to determine whether the host has been blocked by one or more servers, such as for example external verification servers configured to provide security information about particular host systems. For example, the host access control module 224 may initiate a broadcast querying whether any of the one or more verification servers have blocked the host 131 for rogue behaviour.

In some embodiments, in response to a successful re-authentication of the host 131 with the DSD 100 (i.e. at step 830), the host access control module 224 is configured to conduct a host-type re-authentication 840 to generate a determination of the host-type of host 131 (i.e., according to 320 and 330, as depicted in FIGS. 3b, 4a to 4c). The host-type re-authentication 840 enables the HSA 200 to reconsider the host-type to enable rectification of a previously incorrectly host-type determination, and any inaccurate determination of the security threat level $L_h$ that subsequently occurred.

In some embodiments, the host access control module 224 may conduct an accessibility-permission level reduction process 850 to reduce the accessibility permissions for the host 131 to a safe level. For example, in response to a determination that host 131 is a rogue host, the host access control module 224 may reduce or refuse to perform access activities such as overwrites or deletions from the host 131.

In some embodiments, the host access control module 224 is configured to perform a host blacklisting process 860, to block the host 131. In some implementations, blacklisting involves the DSD 100 refusing to perform any access activities from the host 131. In other implementations, in response to blacklisting the host 131, the DSD 100 severs the logical data connection between the host 131 and the medium 108 via the data path (i.e., such that all incoming control commands and transferred data is discarded on determination of host 131 as the source).

The invention claimed is:

1. A method for securing a data storage device (DSD) against rogue behaviour by a host, the method executed by a controller of the DSD and comprising:
   determining a host type of the host;
   detecting one or more access activities performed by the host on the DSD;

processing the one or more access activities to determine an observed activity criteria matrix comprised of activity values for the one or more access activities;
retrieving an expected activity criteria matrix comprised of expected values for host behaviour;
determining a set of access activity parameters indicating deviations of the observed activity criteria matrix from the expected activity criteria matrix;
determining a security threat level of the host by weighting one or more corresponding access activity parameters from the set of access activity parameters by one or more impact weights; and
in response to determining that the security threat level of the host is greater than or equal to a rogue host threat level, controlling the access activities performable by the host on the DSD to safeguard the DSD against the host, wherein the one or more impact weights are dynamically determined based on the host type.

2. The method of claim 1, wherein the expected activity criteria matrix comprises parameters of an access activity model determined during a training operation for expected access activity of the host type.

3. The method of claim 1, wherein the rogue host threat level is a numerical threshold value determined, at least in part, based on the host type.

4. The method of claim 3, wherein the access activities comprise any one or more of:
requesting to read data from, or write data to, a storage medium of the DSD;
requesting access to one or more logical region blocks of the storage medium of the DSD; and
receiving data from, or transmitting data to, a data path of the DSD.

5. The method of claim 1, wherein:
the observed activity criteria matrix and the expected activity criteria matrix each comprise a matrix of a number of activity patterns by a number of criteria comprising each activity pattern; and
determining the set of access activity parameters comprises calculating the access activity parameter as a normalized numeric value based on comparison of corresponding elements from the observed activity criteria matrix and the expected activity criteria matrix.

6. The method of claim 5, wherein the activity values of the one or more access activities for an activity pattern include a numeric feature vector of at least two respective indications selected from:
a type of the access activity;
a number of occurrences of the access activity;
one or more data features representing one or more characteristics of the access activity; and
one or more permission features representing a permission of the host to perform the access activity on the DSD.

7. The method of claim 6, wherein the one or more data features are determined by a data parsing operation conducted prior to storage of any of the corresponding access activity data in the DSD.

8. The method of claim 1, wherein the host type is determined by a pre-specified mapping that associates at least one identifier of the host to the host type.

9. The method of claim 8, wherein the pre-specified mapping is determined according to:
a host-assisted determination process, wherein the host informs the DSD to associate the host with one of a plurality of host types; or
a device-detected determination process, wherein the DSD determines a prior data access pattern of the host and determines the host type from an association between the prior data access pattern and a known data access pattern.

10. The method of claim 1, wherein determining the host type comprises:
aggregating prior data access patterns of the host based on detection of the one or more access activities of the host;
extracting features related to one or more host types; and
classifying the features to output the host type.

11. The method of claim 1, wherein at least one of the access activity parameters are determined by calculating an indication of a match between the corresponding detected access activity performed by the host and one or more irregular activities.

12. The method of claim 11, wherein the one or more irregular activities comprise any one or more of:
one or more irregular commands submitted by the host, wherein identification of a command as irregular is based on one or more expected commands of the host;
data thrashing of pre-fetched data exceeding a system data thrashing threshold; and
one or more irregular activity patterns of the host, wherein identification of an activity pattern as irregular is based on a deviation between one or more observed activity patterns of the host, and one or more learned activity patterns of the host.

13. The method of claim 1, wherein controlling the access activities of the host to safeguard the DSD comprises one or more of:
initiating an intimation to the host;
conducting one or more rule-based data flushes;
re-authenticating the host;
re-evaluating the host type of the host if the host is re-authenticated;
reducing one or more levels of accessibility permissions; and
blacklisting the host.

14. The method of claim 13, wherein conducting one or more rule-based data flushes further comprises buffering data received from the host, and in response to determining the security threat level of the host is less than the rogue host threat level, enabling the buffered data to be stored in the DSD.

15. The method of claim 13, wherein re-authenticating the host further comprises one or more of:
verifying one or more authentication signatures of the host;
verifying an identity of the host; and
determining whether the host is blocked by one or more servers.

16. A data storage device (DSD) comprising:
a non-volatile storage medium configured to store user data;
a data port configured to transmit at least data between the non-volatile storage medium of the data storage device and a host computer system; and
a processor configured to:
determine a host type of the host computer system;
detect one or more access activities performed by the host computer system on the DSD;
process the one or more access activities to determine an observed activity criteria matrix comprised of activity values for the one or more access activities;

retrieve an expected activity criteria matrix comprised of expected values for host behaviour;

determine a set of access activity parameters indicating deviations of the observed activity criteria matrix from the expected activity criteria matrix;

determine a security threat level of the host computer system by weighting one or more corresponding access activity parameters from the set of access activity parameters by one or more impact weights, wherein the one or more impact weights are dynamically determined based on the host type; and control, in response to determining that the security threat level of the host computer system is greater than or equal to a rogue host threat level, the access activities of the host computer system to safeguard the DSD against the host computer system.

17. The data storage device of claim 16, wherein the expected activity criteria matrix comprises parameters of an access activity model determined during a training operation for expected access activity of the host type.

18. The data storage device of claim 16, wherein:

the activity values for the one or more access activities comprise numeric feature vectors;

the observed activity criteria matrix and the expected activity criteria matrix each comprise a matrix of a number of activity patterns by a number of criteria comprising each activity pattern; and determining the set of access activity parameters comprises calculating the access activity parameter as a normalized numeric value based on comparison of corresponding elements from the observed activity criteria matrix and the expected activity criteria matrix.

19. The data storage device of claim 18, wherein the activity values of the one or more access activities for an activity pattern comprise a numeric feature vector of at least two respective indications selected from:

a type of the access activity;

a number of occurrences of the access activity;

one or more data features representing one or more characteristics of the access activity; and one or more permission features representing a permission of the host computer system to perform the access activity on the DSD.

20. A data storage device (DSD) comprising:

a non-volatile storage medium configured to store user data;

means for transmitting at least data between a host and the data storage device;

means for determining a host type of the host;

means for detecting one or more access activities performed by the host on the DSD;

means for processing the one or more access activities to determine an observed activity criteria matrix comprised of activity values for the one or more access activities;

means for retrieving an expected activity criteria matrix comprised of expected values for host behaviour;

means for determining a set of access activity parameters indicating deviations of the observed activity criteria matrix from the expected activity criteria matrix;

means for determining a security threat level of the host by weighting one or more corresponding access activity parameters from the set of access activity parameters by one or more impact weights, and wherein the one or more impact weights are dynamically determined based on the host type; and means for controlling, in response to determining that the security threat level of the host is greater than or equal to a rogue host threat level, the access activities of the host to safeguard the DSD against the host.

* * * * *